US011585536B2

(12) United States Patent
Murad

(10) Patent No.: US 11,585,536 B2
(45) Date of Patent: *Feb. 21, 2023

(54) COOKING APPLIANCE

(71) Applicant: Team International Group of America Inc., Miami Gardens, FL (US)

(72) Inventor: Uri Murad, Hollywood, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/567,535

(22) Filed: Jan. 3, 2022

(65) Prior Publication Data

US 2022/0120445 A1 Apr. 21, 2022

Related U.S. Application Data

(60) Division of application No. 17/518,876, filed on Nov. 4, 2021, which is a continuation-in-part of application No. 17/176,838, filed on Feb. 16, 2021, now Pat. No. 11,175,048.

(60) Provisional application No. 62/982,999, filed on Feb. 28, 2020.

(51) Int. Cl.
| | |
|---|---|
| *F24C 15/16* | (2006.01) |
| *F24C 7/08* | (2006.01) |
| *G05D 23/19* | (2006.01) |
| *F24C 15/32* | (2006.01) |

(52) U.S. Cl.
CPC .......... *F24C 7/085* (2013.01); *F24C 15/166* (2013.01); *F24C 15/325* (2013.01); *G05D 23/1931* (2013.01)

(58) Field of Classification Search
CPC ........ F24C 7/085; F24C 15/16; F24C 15/325; F24C 15/28; F24C 7/105; G05D 23/1931; A47J 2/002

USPC ......................................................... 219/749
See application file for complete search history.

(56) References Cited

U.S. PATENT DOCUMENTS

| | | |
|---|---|---|
| 370,849 A | 10/1887 | Baxter |
| 1,208,637 A | 12/1916 | Phelps |
| 2,024,386 A | 12/1935 | Phelps |
| 2,707,225 A | 4/1955 | Pearce |
| 2,708,709 A | 5/1955 | Pearce |
| 2,798,930 A | 7/1957 | Frost |
| 2,889,825 A | 6/1959 | Evans |
| 3,009,458 A | 11/1961 | Pearce |
| 3,548,154 A | 12/1970 | Christiansson |

(Continued)

FOREIGN PATENT DOCUMENTS

| | | |
|---|---|---|
| CN | 102551518 | 2/2014 |
| CN | 107559904 | 1/2018 |

(Continued)

*Primary Examiner* — Avinash A Savani
(74) *Attorney, Agent, or Firm* — Frank Marino

(57) ABSTRACT

A cooking appliance is disclosed that includes a cooking cavity, a first heating element disposed adjacent a top of the cooking cavity, a second heating element disposed adjacent a bottom of the cooking cavity, a temperature sensor adapted to sense the temperature of air within the cooking cavity, a blower arranged to agitate the air within the cooking cavity, a cookware device removably disposed above and in thermal communication with the second heating element, and a controller adapted to manually receiving cooking parameters from a user and sensed temperature information and to independently and selectively control the heating elements and the blower according thereto.

24 Claims, 30 Drawing Sheets

(56) References Cited

U.S. PATENT DOCUMENTS

| | | | |
|---|---|---|---|
| 4,780,597 A | 10/1988 | Linhart et al. | |
| 5,272,317 A | 12/1993 | Ryn | |
| 5,618,458 A | 4/1997 | Thomas | |
| 5,938,959 A | 8/1999 | Wang | |
| 6,362,458 B1 | 3/2002 | Sargunam et al. | |
| 6,595,117 B1 * | 7/2003 | Jones | A21B 1/245 99/477 |
| 6,891,133 B2 | 5/2005 | Shozo et al. | |
| 7,071,448 B1 | 7/2006 | Kim et al. | |
| 7,368,685 B2 | 5/2008 | Nam et al. | |
| 7,417,204 B2 | 8/2008 | Nam et al. | |
| 7,708,008 B2 | 5/2010 | Elkasevie et al. | |
| 7,735,480 B2 | 6/2010 | Larsen et al. | |
| 7,814,897 B2 | 10/2010 | Larsen | |
| 8,226,180 B2 | 7/2012 | Patill et al. | |
| 8,336,535 B2 | 12/2012 | Larsen et al. | |
| 8,381,712 B1 | 2/2013 | Simms | |
| 8,510,991 B2 | 8/2013 | Collene | |
| 8,584,663 B2 | 11/2013 | Kim et al. | |
| 8,878,106 B2 | 11/2014 | Hensel et al. | |
| 8,944,536 B2 | 2/2015 | Yantis et al. | |
| 9,188,346 B2 | 11/2015 | Yantis et al. | |
| 9,255,712 B2 | 2/2016 | Yantis et al. | |
| 9,328,929 B2 | 5/2016 | Yantiis et al. | |
| 9,494,323 B2 | 11/2016 | Yantis et al. | |
| 9,644,848 B2 | 5/2017 | Yantis et al. | |
| 9,651,265 B2 | 5/2017 | Yantis et al. | |
| 9,756,981 B2 | 9/2017 | Fung | |
| 9,777,927 B2 | 10/2017 | Armstrong et al. | |
| 9,890,957 B2 | 2/2018 | Yantis et al. | |
| 10,018,364 B2 | 7/2018 | Yantis et al. | |
| D858,172 S | 9/2019 | Moore | |
| 2006/0096969 A1 | 5/2006 | Kim | |
| 2007/0170183 A1 | 7/2007 | Hannan et al. | |
| 2011/0146653 A1 * | 6/2011 | Kitatani | A47J 37/0629 126/19 R |
| 2012/0160823 A1 | 6/2012 | Bryce et al. | |
| 2012/0180775 A1 | 7/2012 | Waltz et al. | |
| 2015/0096550 A1 | 4/2015 | Paler et al. | |
| 2015/0101592 A1 | 4/2015 | Cadima | |
| 2017/0245683 A1 | 8/2017 | Chen et al. | |
| 2017/0328573 A1 | 11/2017 | Wojick et al. | |
| 2018/0142900 A1 * | 5/2018 | McKee | A21B 2/00 |
| 2018/0220842 A1 | 8/2018 | Delrue et al. | |
| 2019/0374059 A1 | 12/2019 | Samonigg et al. | |
| 2020/0072475 A1 | 3/2020 | Crow et al. | |
| 2021/0212506 A1 | 7/2021 | Martin et al. | |
| 2021/0310663 A1 | 10/2021 | Tedeschi | |

FOREIGN PATENT DOCUMENTS

| | | |
|---|---|---|
| CN | 110664270 | 1/2020 |
| EP | 2026014 | 2/2009 |
| WO | WO2012007681 | 1/2012 |
| WO | WO2018019766 | 1/2018 |

* cited by examiner

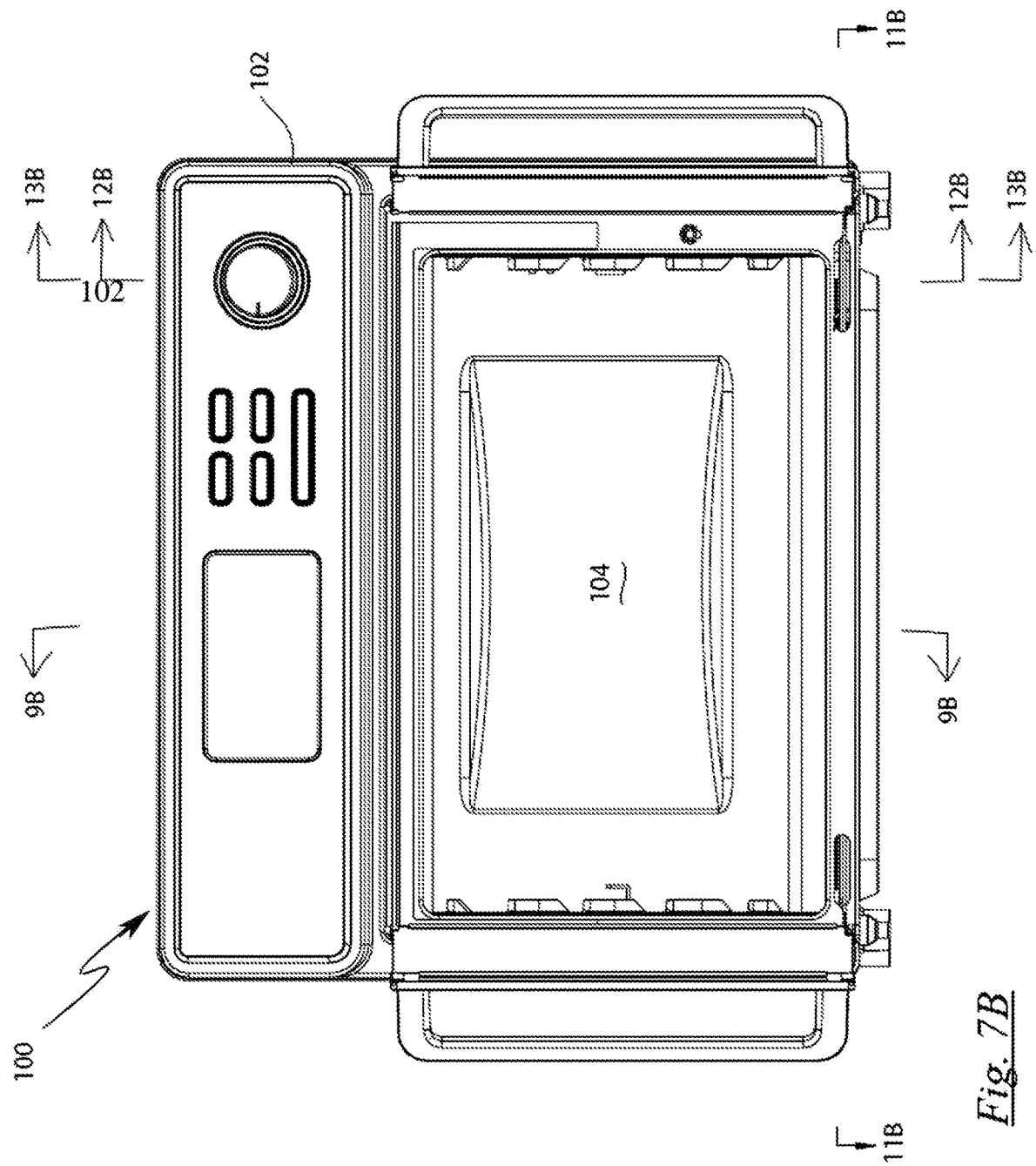

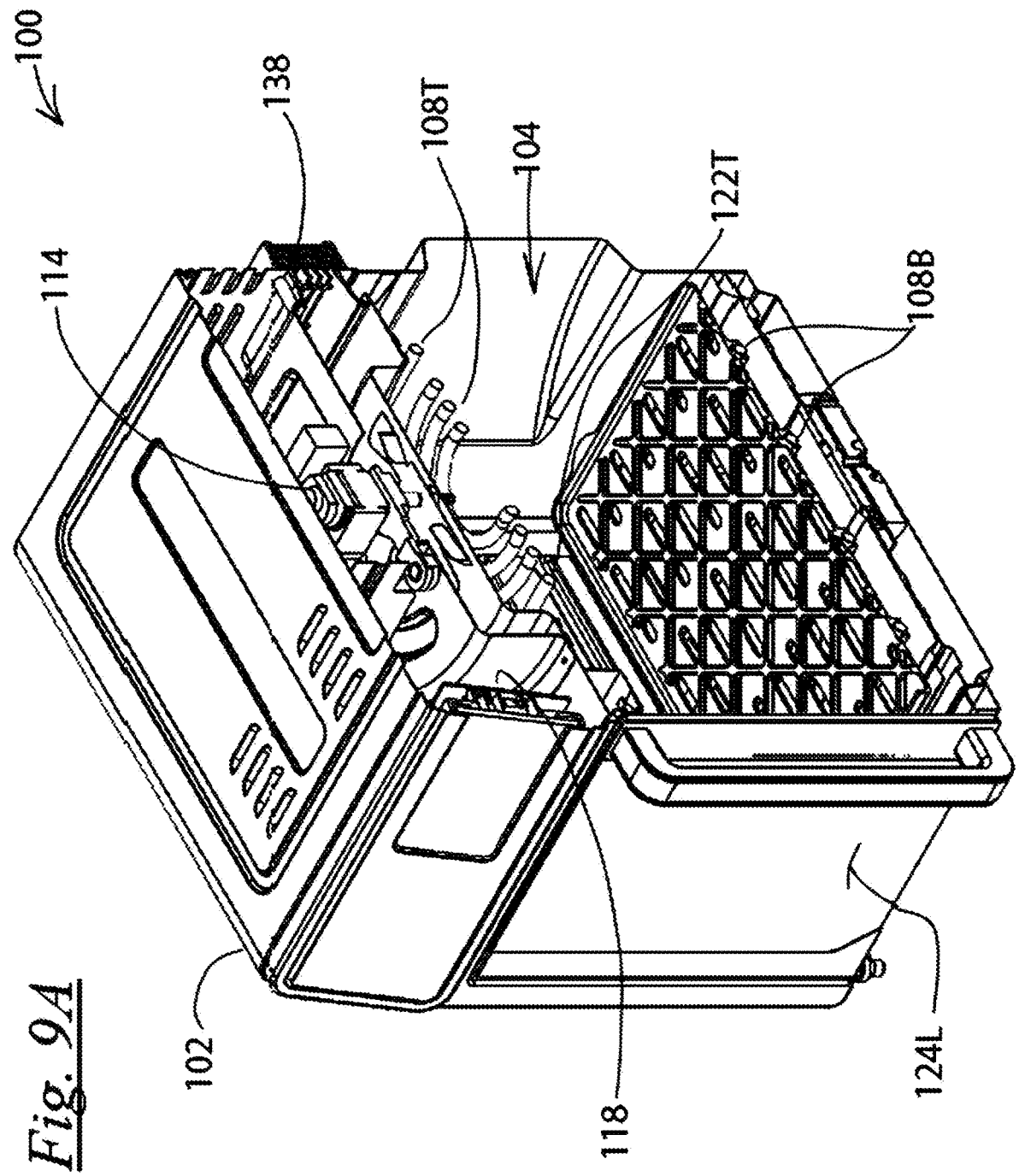

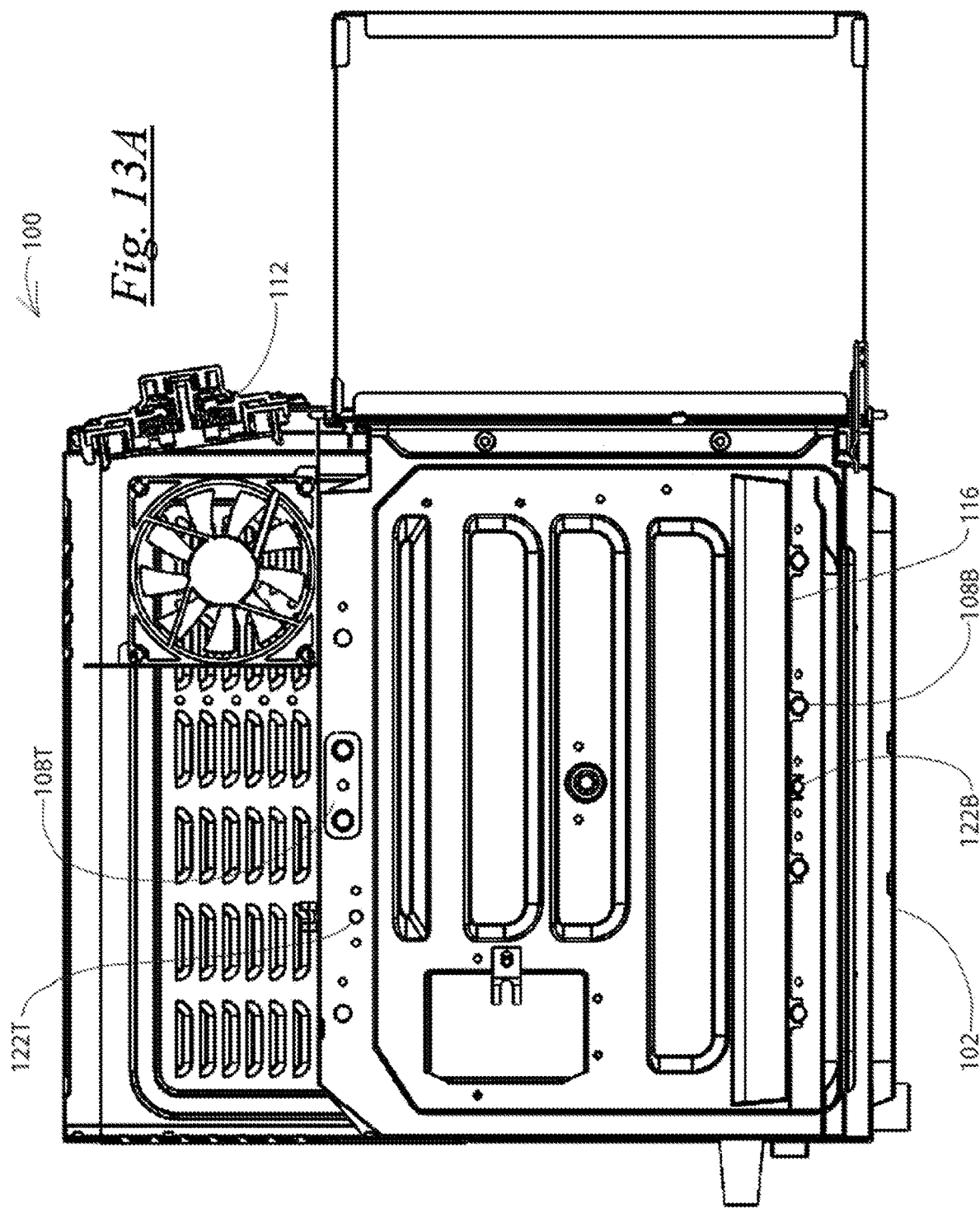

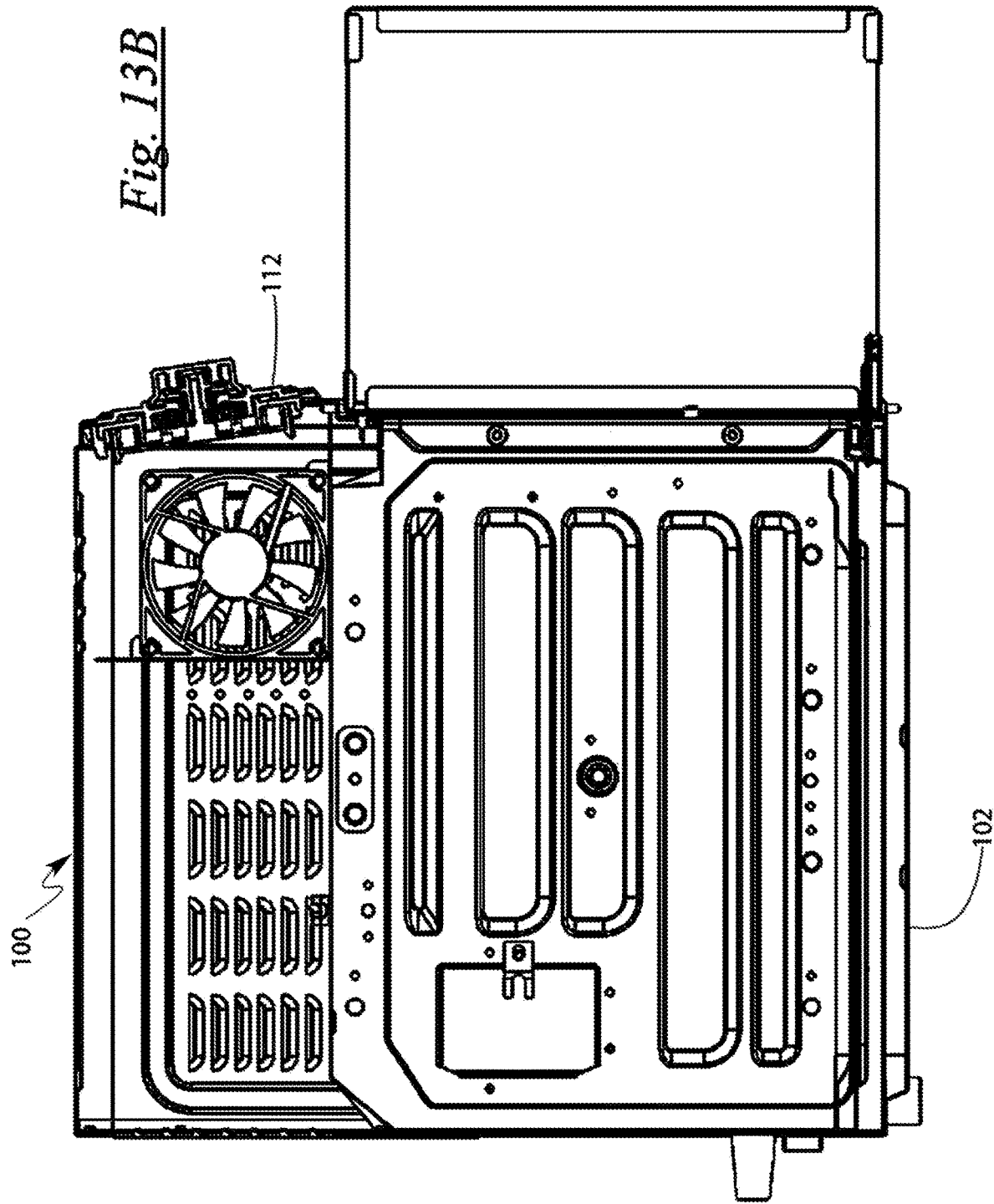

COOKING APPLIANCE

FIELD OF THE INVENTION

The invention relates to cooking appliances. More specifically, it relates to countertop electric ovens, particularly such an oven having versatility to roast, convection-bake, broil, air-fry, grill, and griddle foods, and having a convenient and safe access arrangement.

BACKGROUND

Electric ovens are well known and typically fall within several categories; microwave ovens, steam ovens, radiant ovens, convection ovens, and fan-forced convection ovens. Microwave ovens cook food within the cooking cavity by directing microwave energy into the food to heat it. Steam ovens expose the food to penetrating hot steam which may be produced by a heating element immersed in water. Radiant ovens include a heating element that exposes the food to radiated heat. Convection ovens include a heating element that heats air within the cooking cavity to roast or bake the food. And fan-forced convection ovens add a fan to a convection oven to move the heated air, which is found to reduce cooking time and increase cooking evenness.

Air Fryers are well known and are an extreme form of fan-forced convection oven in which high temperature air at a high airflow rate is applied to oily food or food that has been coated in oil to brown the food in a manner that mimics the browning, crispiness, and flavor of deep frying, but without the mess, danger, and calories.

Surface-cooking, or contact-cooking, is another known method of cooking certain foods in which the food is placed onto a heated surface, such as a frying pan, grill, or a griddle, and the food is cooked from below. While griddle plates have holed or slots therethrough to allow fats and oils to drip through into an underlying catch tray, frying pans and griddles are flat surfaces without holes so that fatty foods cooked thereon tend to simmer in their released fats, which may on one hand add flavor, but on the other hand increase calories.

Radiant-cooking is another known cooking method in which heat radiating of a heating element heats a cooking device, such as a frying pan or griddle to cook food therein, or to heat the food thereon directly.

Broiling is another known method of cooking certain foods in which a heating element is disposed above the food so that the food is exposed to convection and/or radiant heat from above. Broiling can better brown certain foods and while it may have a drying effect, it results in less calories provided the food is placed on a draining surface such as a grill.

The temperature of air can vary throughout the cooking cavity, even in a convection oven. A single sensor cannot ensure that the temperature throughout the oven is even or that the average temperature within the oven is measured. A single sensor therefore cannot ensure that the food is cooked evenly from above and from below. A single sensor therefore cannot enable balancing of the cooking of the food brome above and from below, which balancing may vary according to the cooking method or food type.

The interior of electric ovens and the food being cooked therein can obviously be very hot. For safety, it is preferable that they oven be configured to allow insertion and removal of the food with minimal exposure to that heat and the things it has heated. And because the user will typically need to hold the food in one hand while opening the oven, it is preferable that the insertion and removal can be accomplished with only one hand while access to the oven can be accomplished with only the other. And for energy efficiency it is preferable to only open the oven for the insertion and removal of food to the extent needed, according to the size of the food or the carrying it. These features become more important according to the method of cooking and the type/shape of the food, so in a cooker that provides multiple cooking modes and expects to receive many types of foods, these features must perform optimally for each.

For the sake of this document and to support such terms as used herein, the following are definitions of various types of cooking devices;

Rice Pot—a cauldron, pot, or pan, intended for steaming rice and having a lid for retaining moisture within.

Grill Plate—a planar metal plate for contact-grilling foods and having raised ribs and/or holes or slots therethrough for allowing oils and fats to drain from the foods.

Griddle or Griddle Plate—a planar metal panel for contact-cooking foods and having a flat cooking surface.

Frying Pan—a planar metal pan for contact-cooking foods and having a flat cooking surface and one of more handles for lifting.

Slow Cooker or Slow Cooking Pot—a cauldron, or pan, usually made of a stone or ceramic material, intended for cooking foods at low heat for a long period and having a lid, usually made of a stone or ceramic material, for retaining moisture within.

Cooking Pot—a deep-sided cauldron or pot for containing foods during cooking, with or without a lid.

Baking Pan or Tray—a shallow-sided pan or tray for placing foods onto during baking or air-frying.

There exists the need to provide, and such may be an object of the invention, an apparatus which can selectively perform one or more of the tasks of roasting, baking, air-frying, broiling, convection-baking, and surface cooking.

There exists the need to provide, and such may be an object of the invention, an apparatus which can expedite and enhance the grilling of foods, use space more efficiently, and reduce cooking smoke and food greasiness.

There exists the need to provide, and such may be an object of the invention, such an apparatus that has a door system which opens from its center outwardly and only as wide as needed to receive or release the food being cooked. And there exists the need to provide, and such may be an object of the invention, such an apparatus that opens symmetrically with only the other hand.

Further needs and objects of the invention will become apparent upon a review of the following disclosure of an exemplary embodiment.

SUMMARY OF THE INVENTION

The invention may be embodied in or practiced using a cooking appliance which can selectively perform one or more of the tasks of roasting, baking, air-frying, broiling, convection-baking, and surface cooking.

The invention may be embodied in or practiced using a cooking appliance having a housing defining a cooking cavity, a first air heating element disposed adjacent a top of the cooking cavity, a second heating element disposed adjacent a bottom of the cooking cavity, a first temperature sensor adapted to sense a temperature of air within an upper portion of the cooking cavity, a second temperature sensor adapted to sense a temperature of air within a lower portion of the cooking cavity, a blower arranged to agitate air within the cooking cavity, a cookware device removably disposed above the second heating element and in thermal communication therewith such that heating of food on the cookware device is selectively provided thereby, and a controller adapted to manually receive cooking parameters from a user and sensed temperature information from the first and second temperature sensors and to selectively control the heating elements and the blower according thereto.

The cookware device may be removably disposed atop and in physical contact with the second heating element, such that contact-cooking of food on the cookware device is selectively provided thereby.

The controller may be adapted to independently and selectively control the heating elements and the blower according to a comparison of the temperatures sensed by the first and second temperature sensors. The cookware device may have a first foot-print with a first area and the second heating element may have a second foot-print with a second area at least 40 percent of the first area.

The controller may be adapted to independently and selectively control the heating elements and the blower according to an average of the temperatures sensed by the first and second temperature sensors.

The cookware device may be removably disposed above the second heating element, with a gap therebetween, such that radiant-cooking of food on the cookware device is selectively provided thereby.

The second heating element may be of a type taken from the group including one or more straight tubular heating elements, one or more circular tubular heating elements, one or more oval tubular heating elements, one or more U-shaped tubular heating elements, one or more wide U-shaped tubular heating elements, one or more M-shaped tubular heating elements, one or more multi M-shaped tubular heating elements, one or more spiral tubular heating elements, one or more animal-shaped heating elements, one or more snake-shaped heating elements, one or more quartz tubular heating elements, one or more offset Y-shaped tubular heating elements, one or more Y-shaped tubular heating elements, one or more scalloped tubular heating elements, one or more X-shaped tubular heating elements, one or more multi-loop Y-shaped tubular heating elements, one or more offset multi-loop Y-shaped tubular heating elements, one or more fan-shaped tubular heating elements, one or more concentric ringed tubular heating elements, one or more C-shaped tubular heating elements, one or more looped Y-shaped tubular heating elements, one or more double star-shaped tubular heating elements, one or more star-shaped tubular heating elements, one or more double burst-shaped tubular heating elements, and one or more burst-shaped tubular heating elements.

The cookware device may be from the group including a lidded or unlidded cooking pot, a slow-cooking pot, a rice pot, baking pan or tray, a grill plate, and a griddle plate.

Further features and aspects of the invention are disclosed with more specificity in the Description and Drawings provided herein and showing exemplary embodiments of the invention.

BRIEF DESCRIPTION OF THE DRAWINGS

Exemplary embodiments of grilling ovens with air fryer in accordance with or useful in practicing the invention is shown in the accompanying Drawings, of which:

FIG. 7B is a front view of the appliance of FIG. 1 in its opened state with its griddle plate removed;

FIG. 9A is a perspective cross-sectional view of the appliance of FIG. 1 in its closed state, taken at Line 9A-9A of FIG. 2;

FIG. 13A is a cross-sectional view of the appliance of FIG. 1 in its opened state, taken at Line 13A-13A of FIG. 7A;

FIG. 13B is a is a cross-sectional view of the appliance of FIG. 1 in its opened state with its griddle plate removed, taken at Line 13B-13B of FIG. 7B;

DESCRIPTION OF AN EXEMPLARY EMBODIMENT

Figure 1:
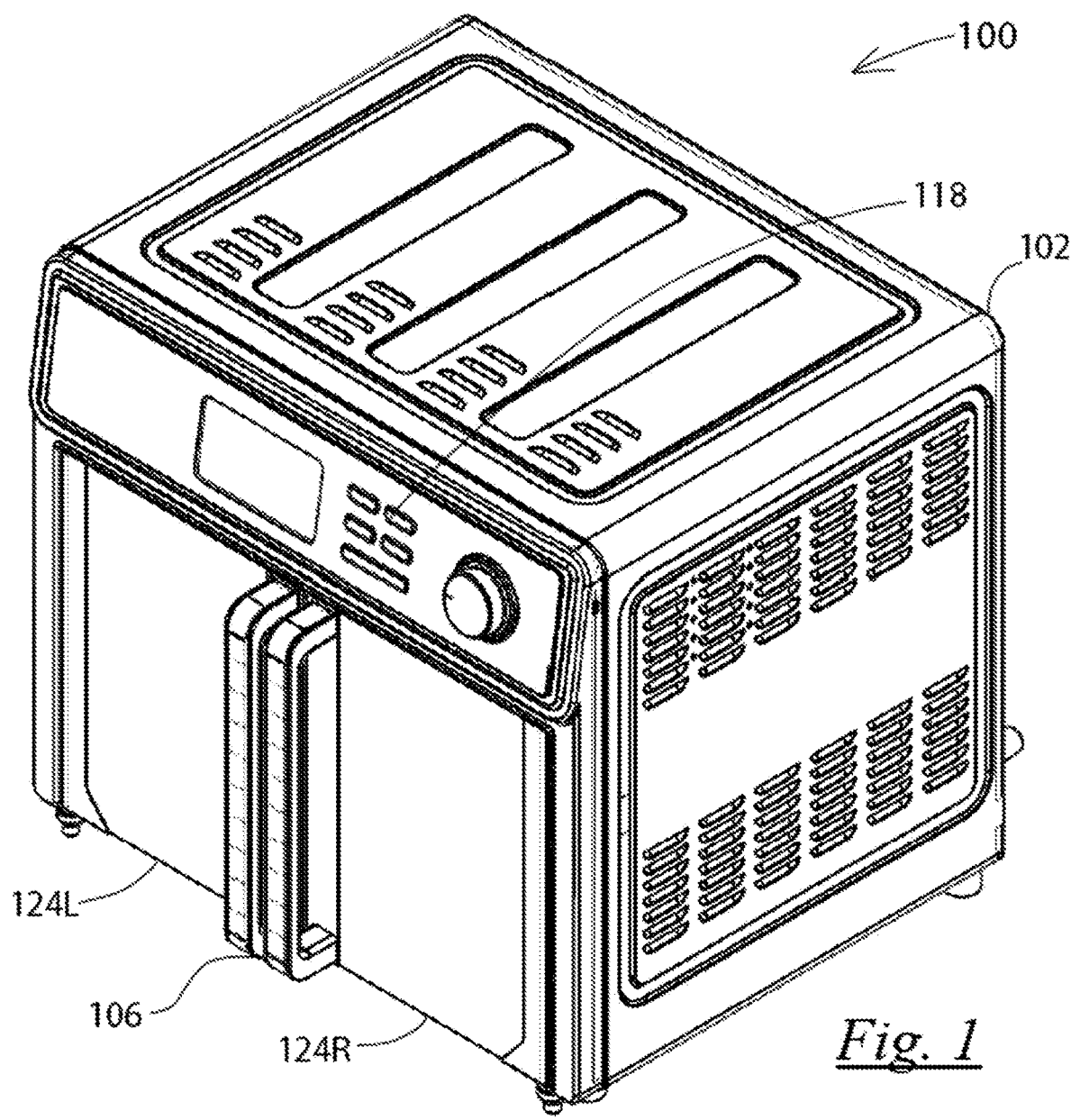
FIG. 1 is a perspective view of a first exemplary cooking appliance in its closed state.
Figure 2:
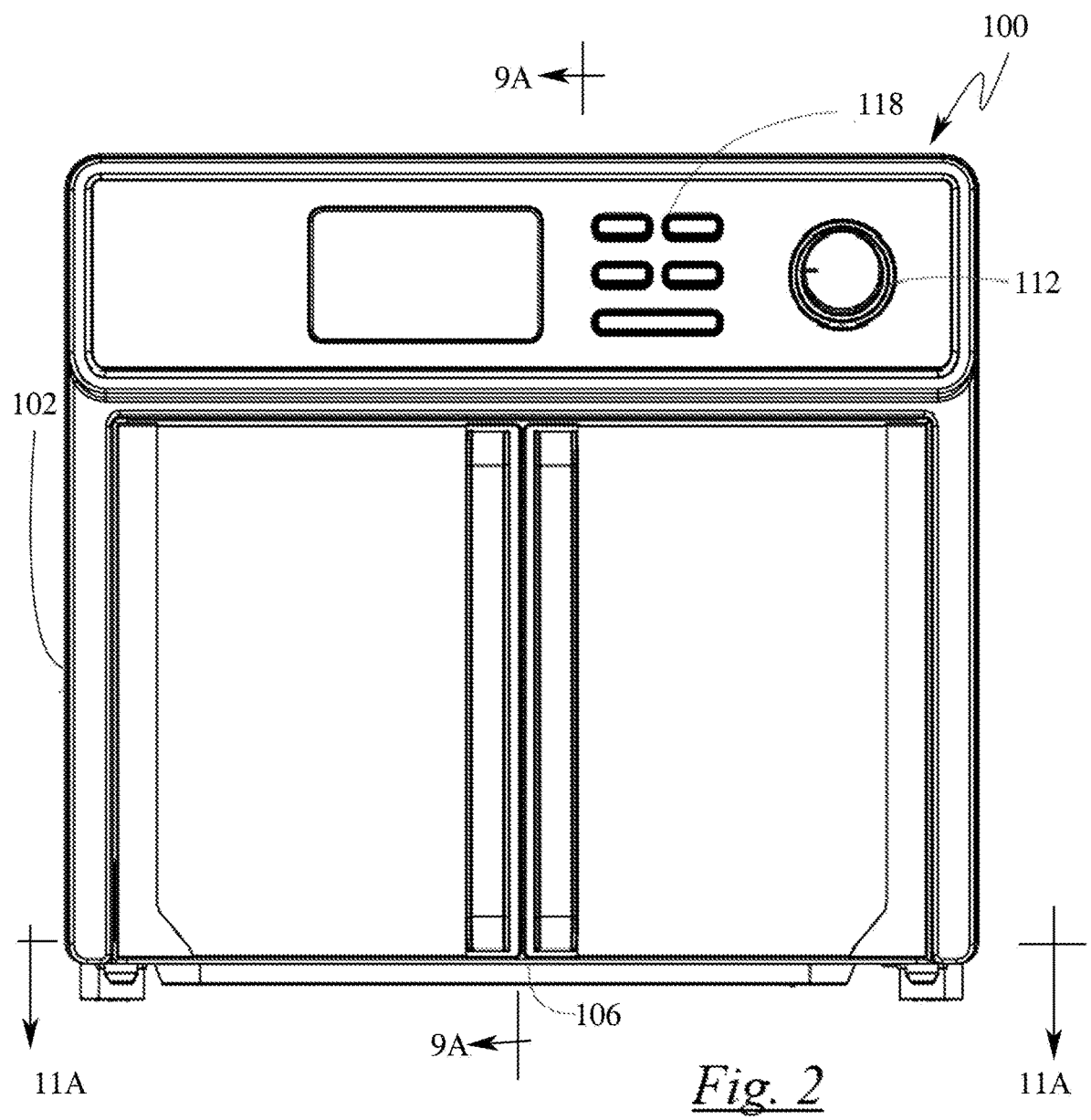
FIG. 2 is a front view of the appliance of FIG. 1 in its closed state.
Figure 3:
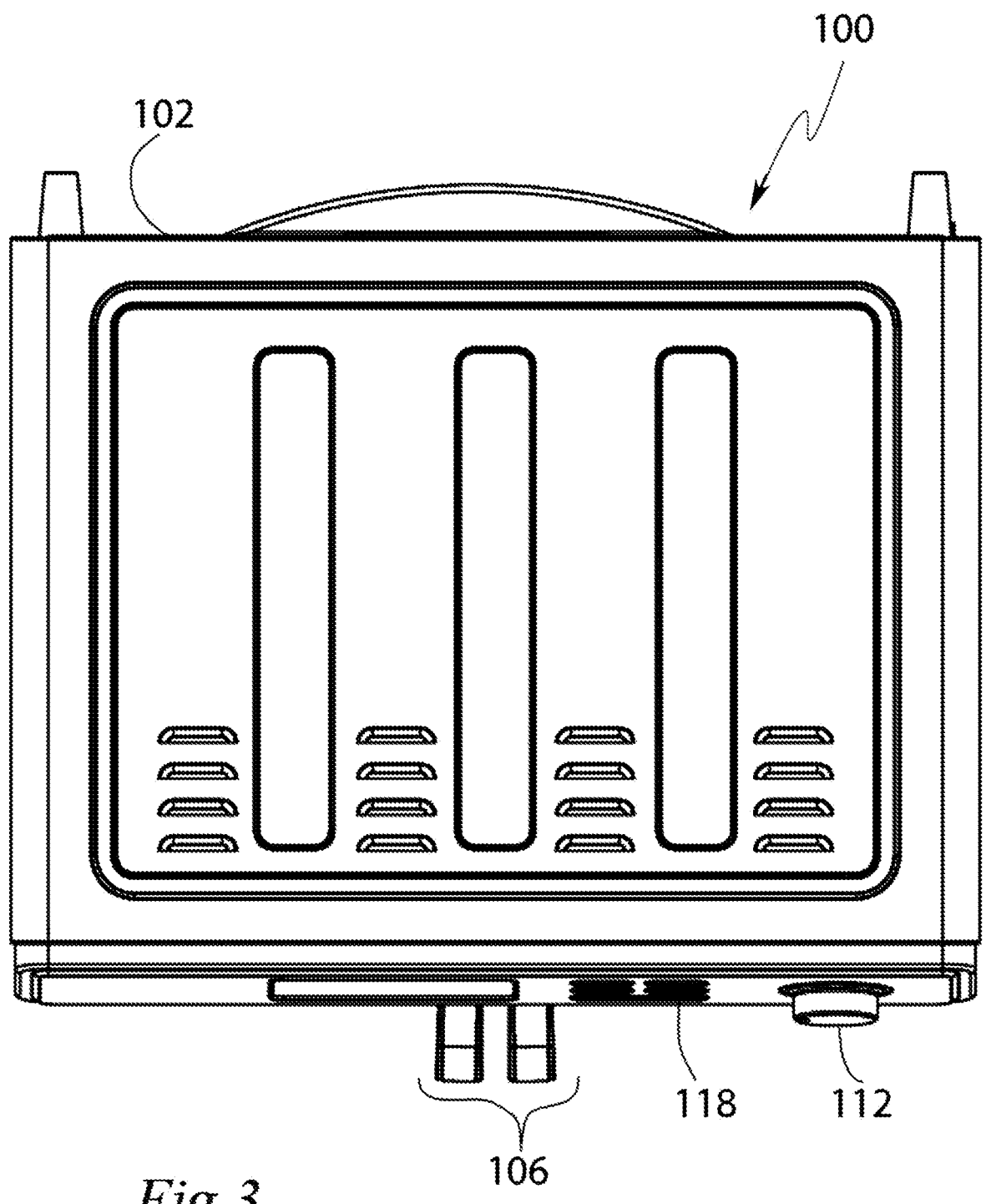
FIG. 3 is a top view of the appliance of FIG. 1 in its closed state.
Figure 4:
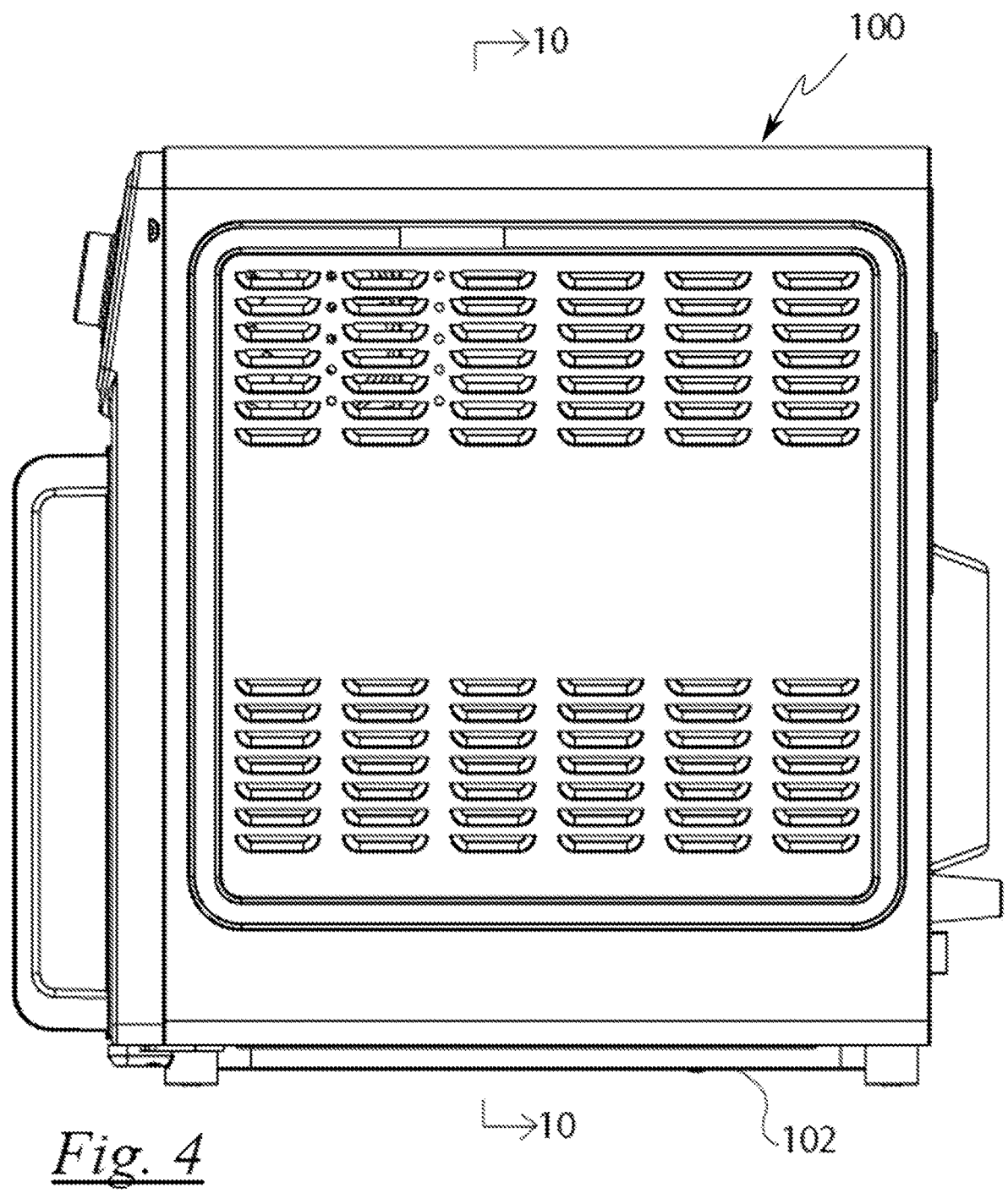
FIG. 4 is a side view of the appliance of FIG. 1 in its closed state.
Figure 5:
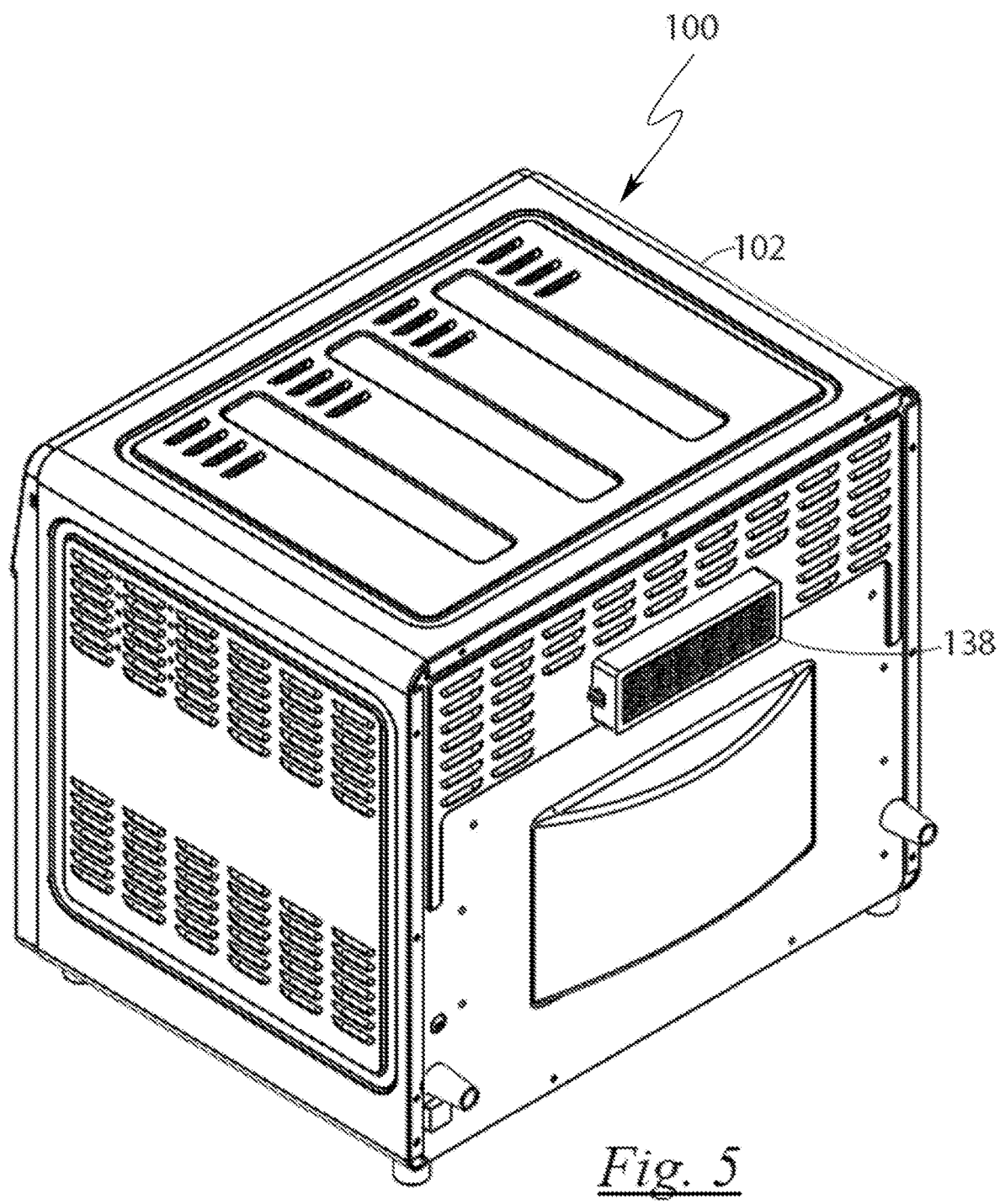
FIG. 5 is a rear perspective view of the appliance of FIG. 1 in its closed state.
Figure 6A:
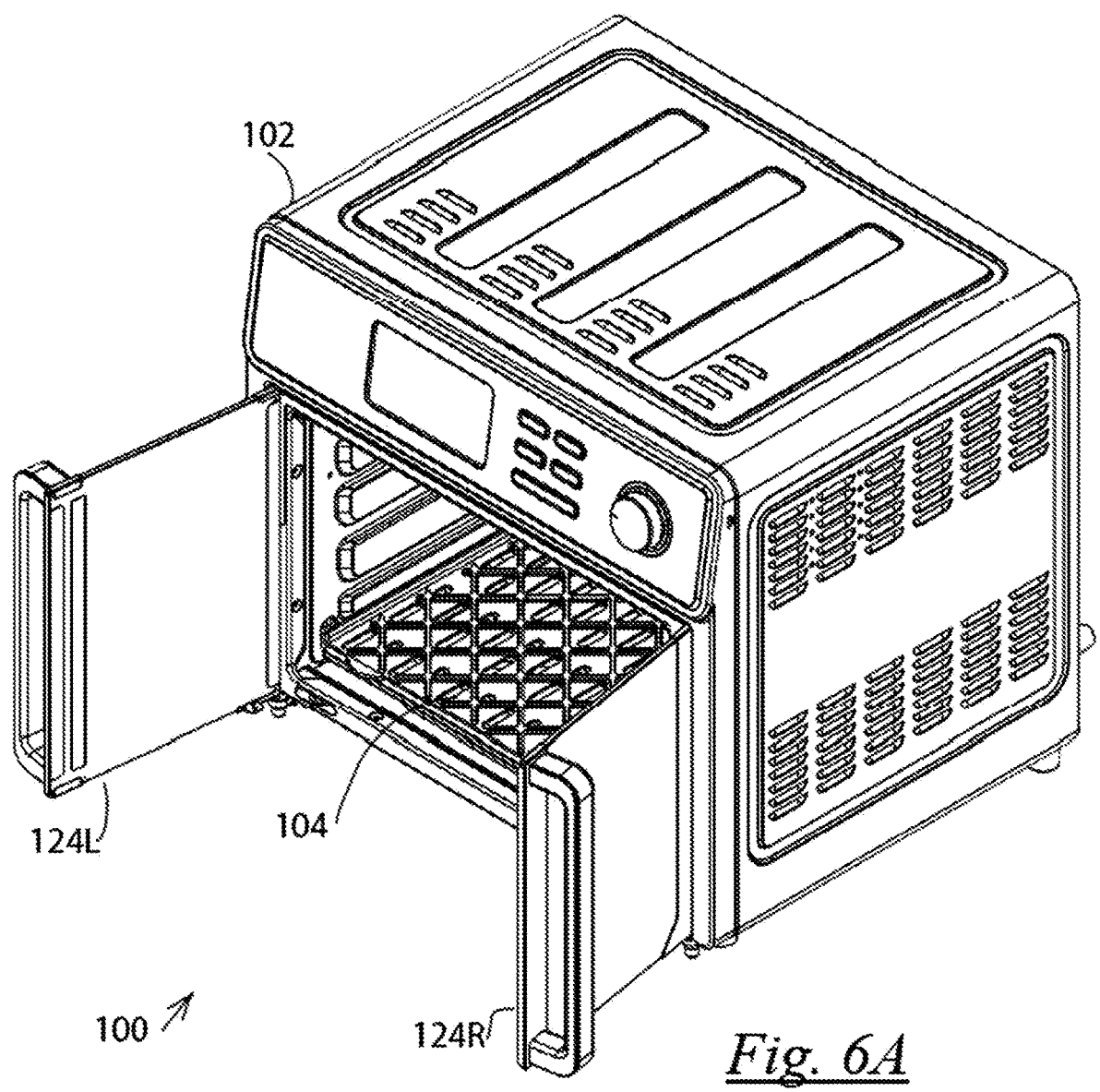
FIG. 6A is a perspective view of the appliance of FIG. 1 in its opened state.
Figure 6B:
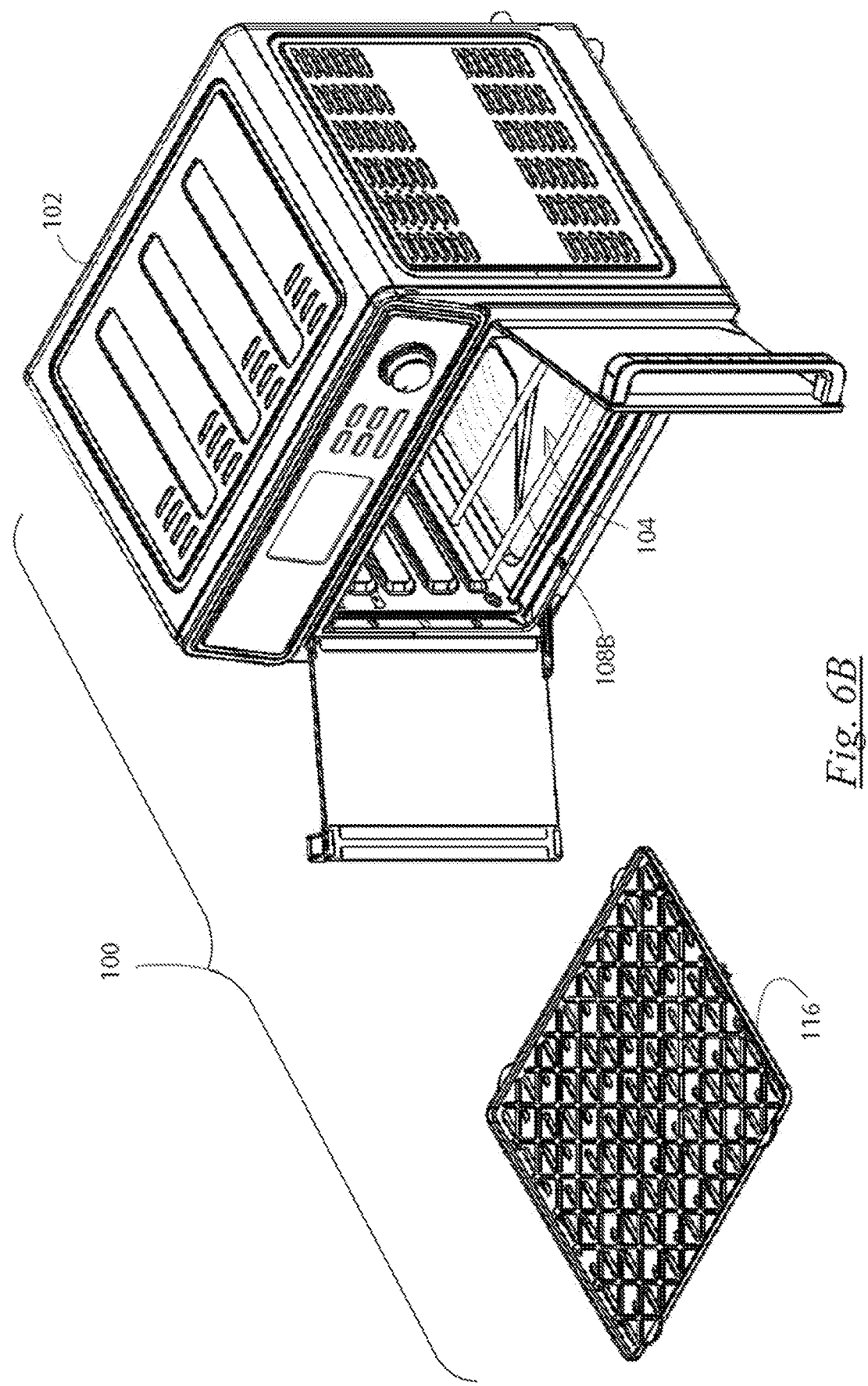
FIG. 6B is a perspective view of the appliance of FIG. 1 in its opened state with its griddle plate removed.
Figure 7A:
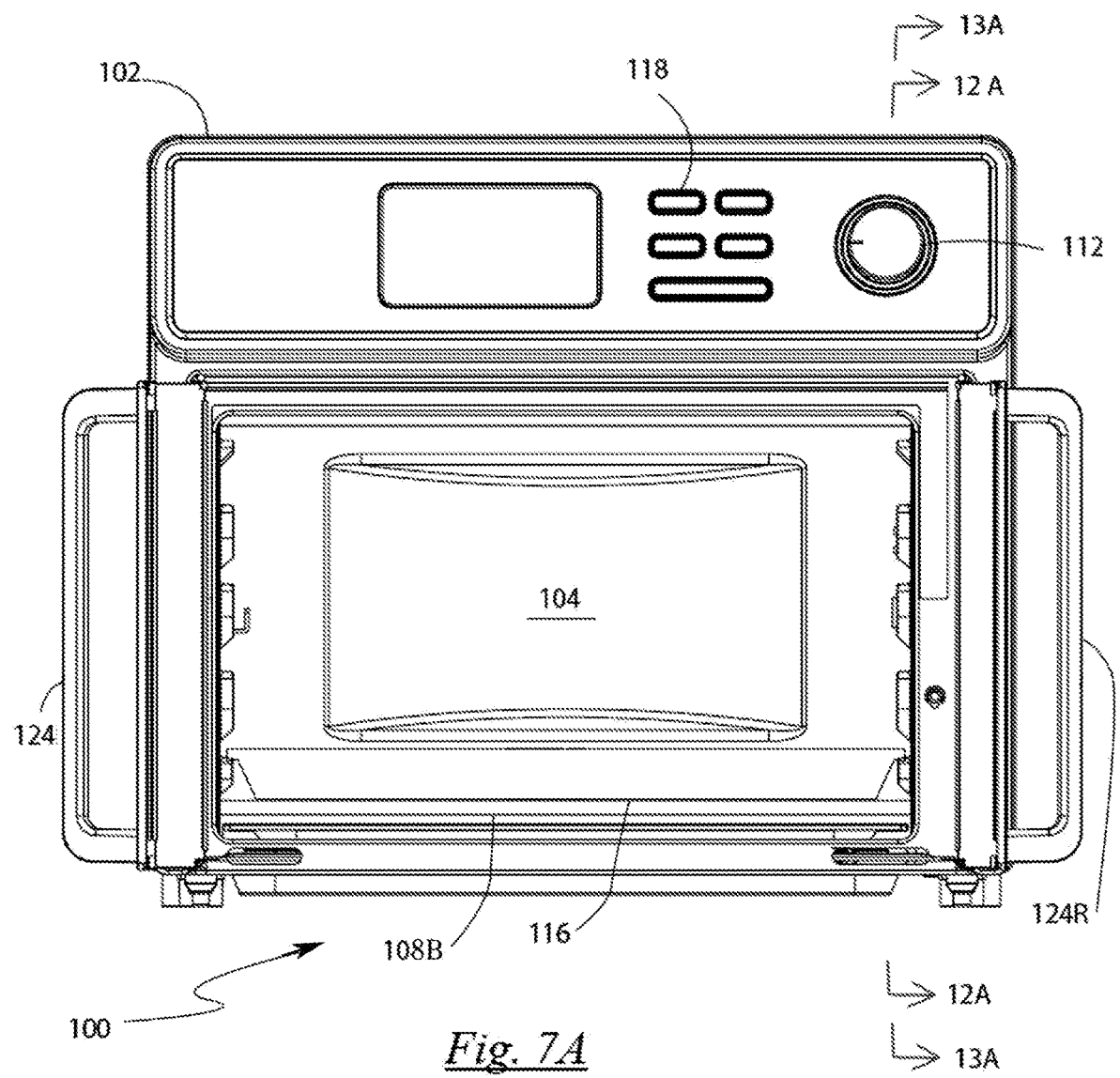
FIG. 7A is a front view of the appliance of FIG. 1 in its opened state.
Figure 8:
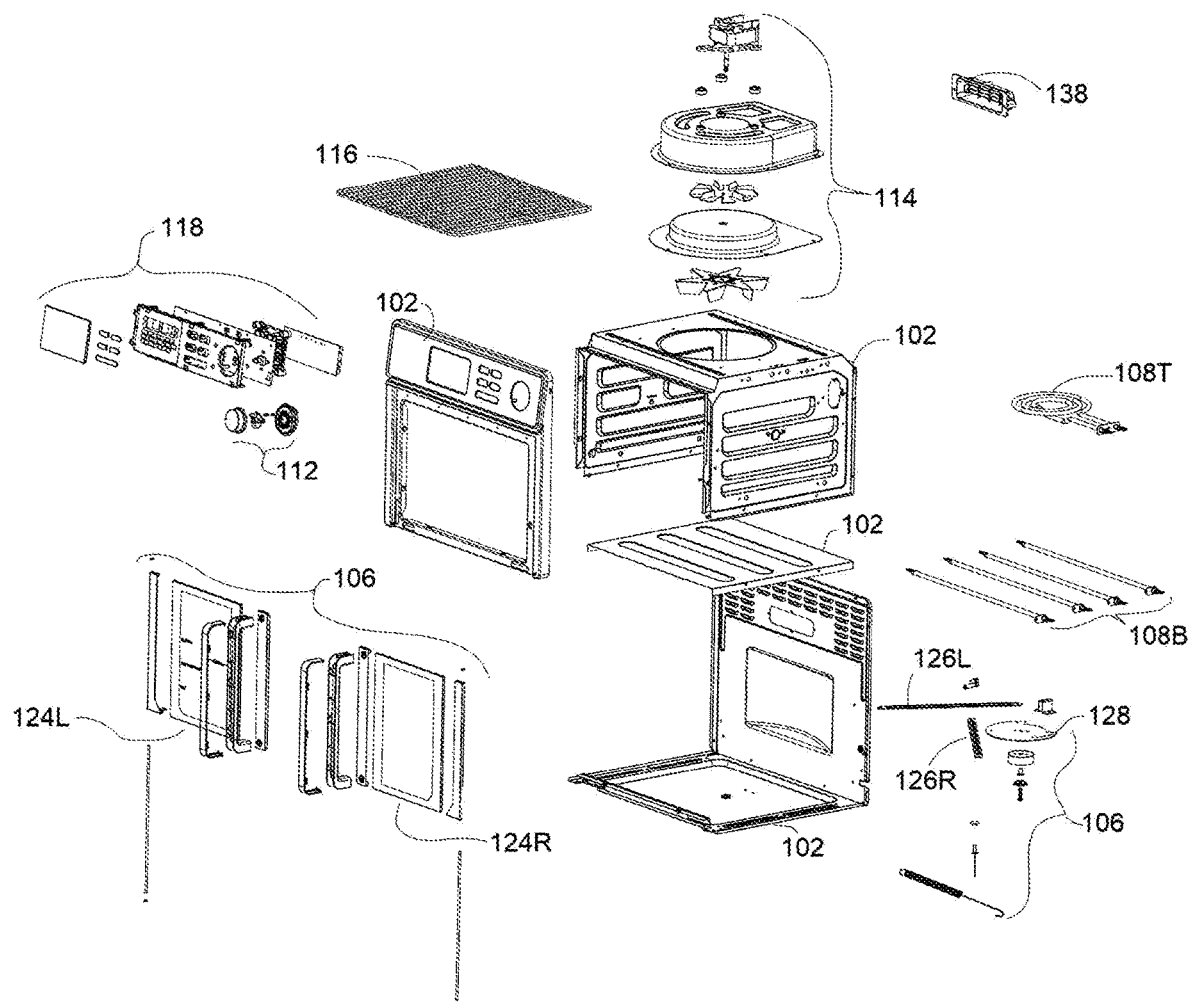
FIG. 8 is an exploded view of the appliance of FIG. 1.
Figure 9B:
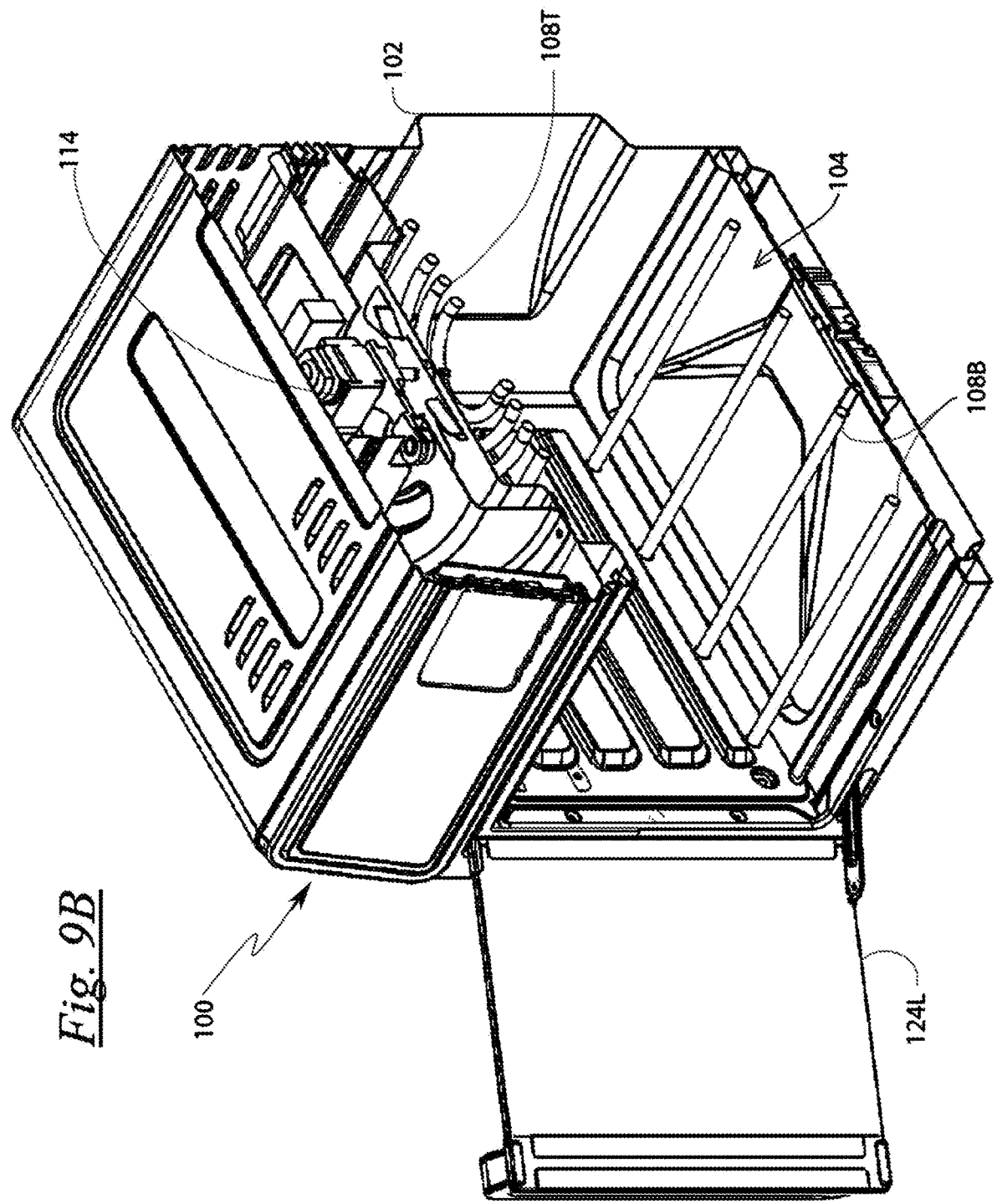
FIG. 9B is a perspective cross-sectional view of the appliance of FIG. 1 in its opened state, taken at Line 9B-9B of FIG. 7B.
Figure 10:
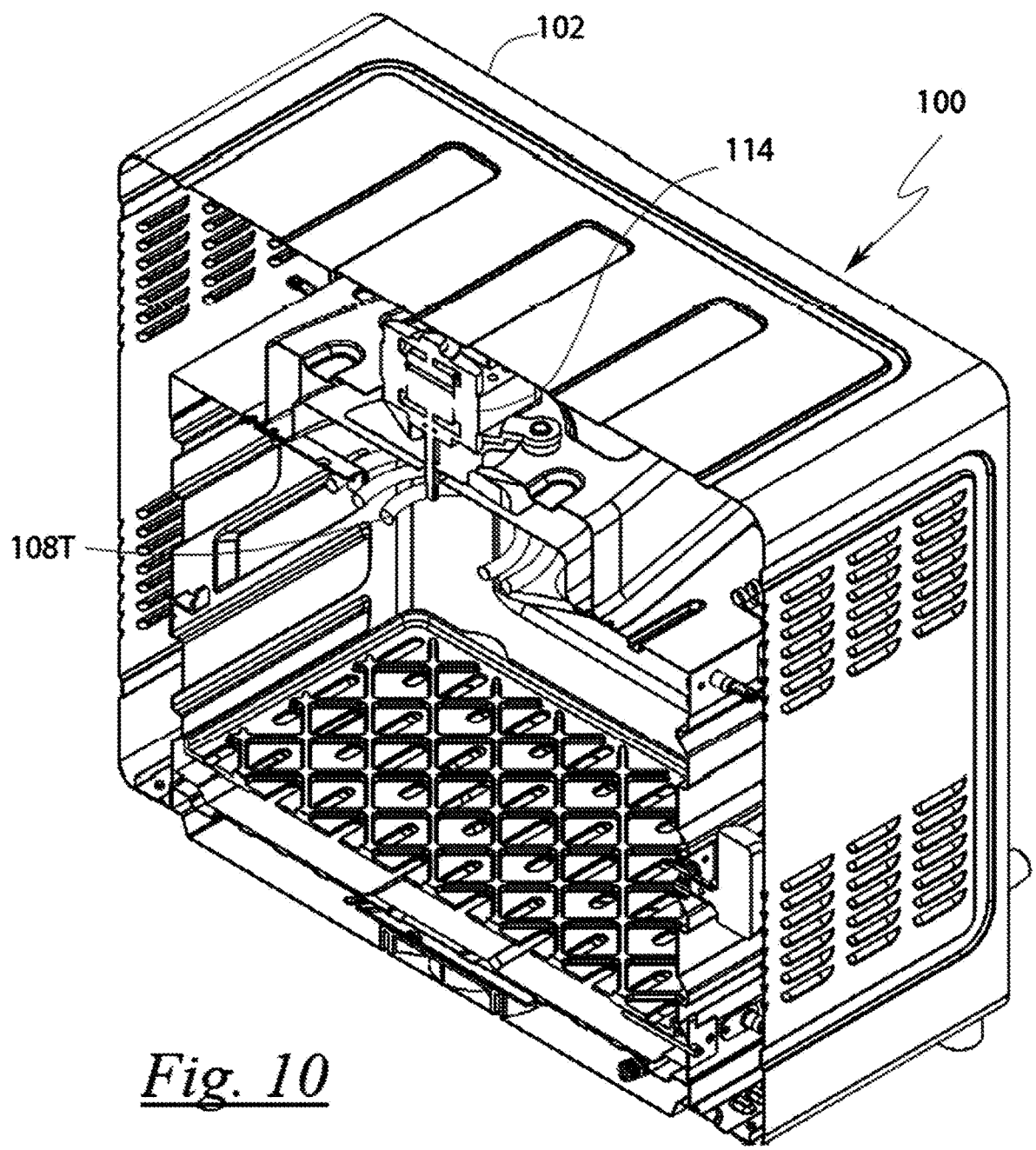
FIG. 10 is a perspective cross-sectional view of the appliance of FIG. 1 taken at Line 10-10 of FIG. 4.

Referring to FIGS. 1 through 16 there is shown an exemplary cooking appliance, here embodied as electrical countertop grilling oven and air frying appliance 100. A housing 102 defines a cooking cavity 104. A door arrangement 106 allows the user to selectively access the cooking compartment. A first electrical heating element 108T is disposed adjacent atop of the cooking cavity. A second electrical heating element 108B is disposed adjacent a bottom of the cooking cavity. A blower 114 is arranged to agitate air within the cooking cavity. A cookware device, embodied here as griddle plate 116, is removably disposed above and in thermal communication with the second electrical heating element. A controller 118 includes an input interface and a timer 112 and is adapted to manually receive cooking parameters from the user and to independently energize the electrical heating elements according thereto. The cooking parameters include information including when, for how long, and at what intensity to operate each of the heating elements and the blower. A first temperature sensor 122T is disposed near the top of the cooking cavity and is adapted to sense the air temperature within an upper portion of the cavity and report the same to the controller. A second temperature sensor 122B is disposed near to the bottom of the cooking cavity and is adapted to sense temperature of a lower portion of the cavity and report the same to the controller. Because the grilling plate is to be in thermal communication with food being cooked, the sensed temperature by the second temperature sensor is proportional to and gives the controller an indication of the temperature of the food. The controller energizes one or more of the electrical heating elements and the blower in accordance with the air and griddle temperatures in accordance with the cooking parameters. Energization may include, turning the blower and heating elements on and off individually and independently for intermittent periods of time according to the timer and the cooking parameters, increasing and decreasing the intensity of the blower and heating elements individually and independently for intermittent periods of time according to the timer and the cooking parameters, or increasing and decreasing the intensity of the blower and heating elements individually and independently continuously according to the timer and the cooking parameters.

And the agitated air may not always need to be hot air. In some cases, it may be beneficial to agitate the air without one or both of the heating elements being energized. For instance, the appliance may serve as an unheated food dehydrator, or a cooked food may wish to be cooled to serving temperature by exposure to agitated cool air for a period of time.

The door arrangement includes left and right outwardly-opening doors, 124L and 124R, respectively. The doors are linked together to open and close symmetrically such that opening or closing either one will cause a symmetrical opening or closing of the other.

The sensors are NTC (negative thermal coefficient) devices adapted to alter resistance inversely according to the sensed temperature, but any known and functionally-acceptable form of temperature detection means could be substituted therefore. The first electrical heating element is an air-heating element. The heating elements are tubular "cal-rod" type elements, but any known and functionally operable form of heating means could be substituted therefore, such as but not limited to those shown in FIGS. 21-44. The griddle plate has perforations 140 to allow the agitated air to pass there-through but need not be so perforated according to the type of food being cooked and the cooking results being desired. For instance, fried chicken may cook best on a perforated griddle plate while fatty bacon may be better cooked on an unperforated grilling plate to capture the liquid fats produced during cooking. Other foods such as casseroles may be best cooked in a side-walled plate (pan). Pies may be best cooked in a pie plate. Deeper cookware devices such as rice pots or casserole dishes could benefit from the heat generated at the bottom of the cavity and/or the hot and/or agitated air.

As long as the second temperature sensor is able to provide a sense of the temperature of the cookware device and the cooking parameters for the food therein are properly input, the air and food can be properly monitored, and the heating element and blower operation can be managed with consideration of the food temperature.

Figure 11A:
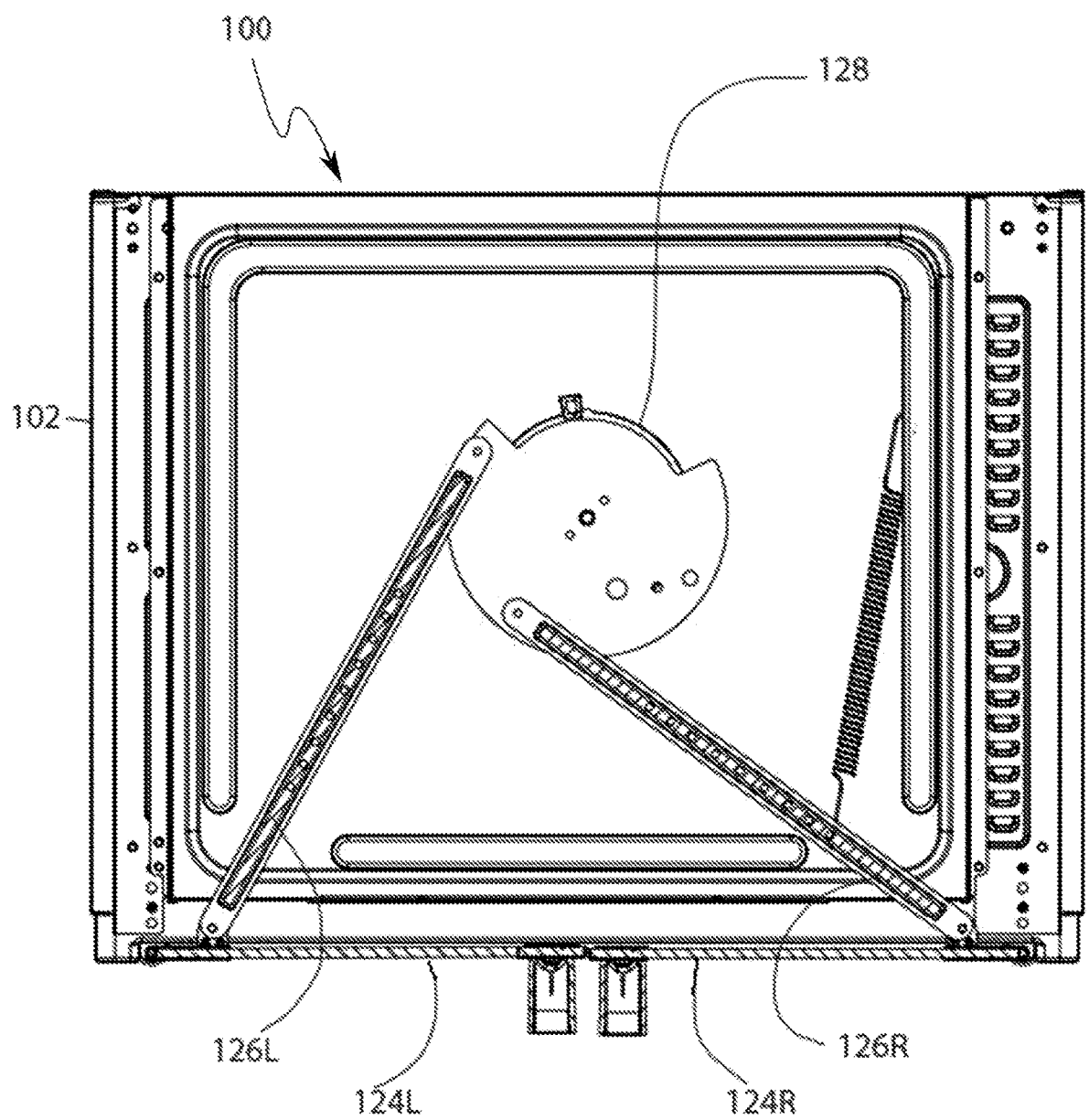
FIG. 11A is a cross-sectional view of the appliance of FIG. 1 in its closed state, taken at Line 11A-11A of FIG. 2.
Figure 11B:
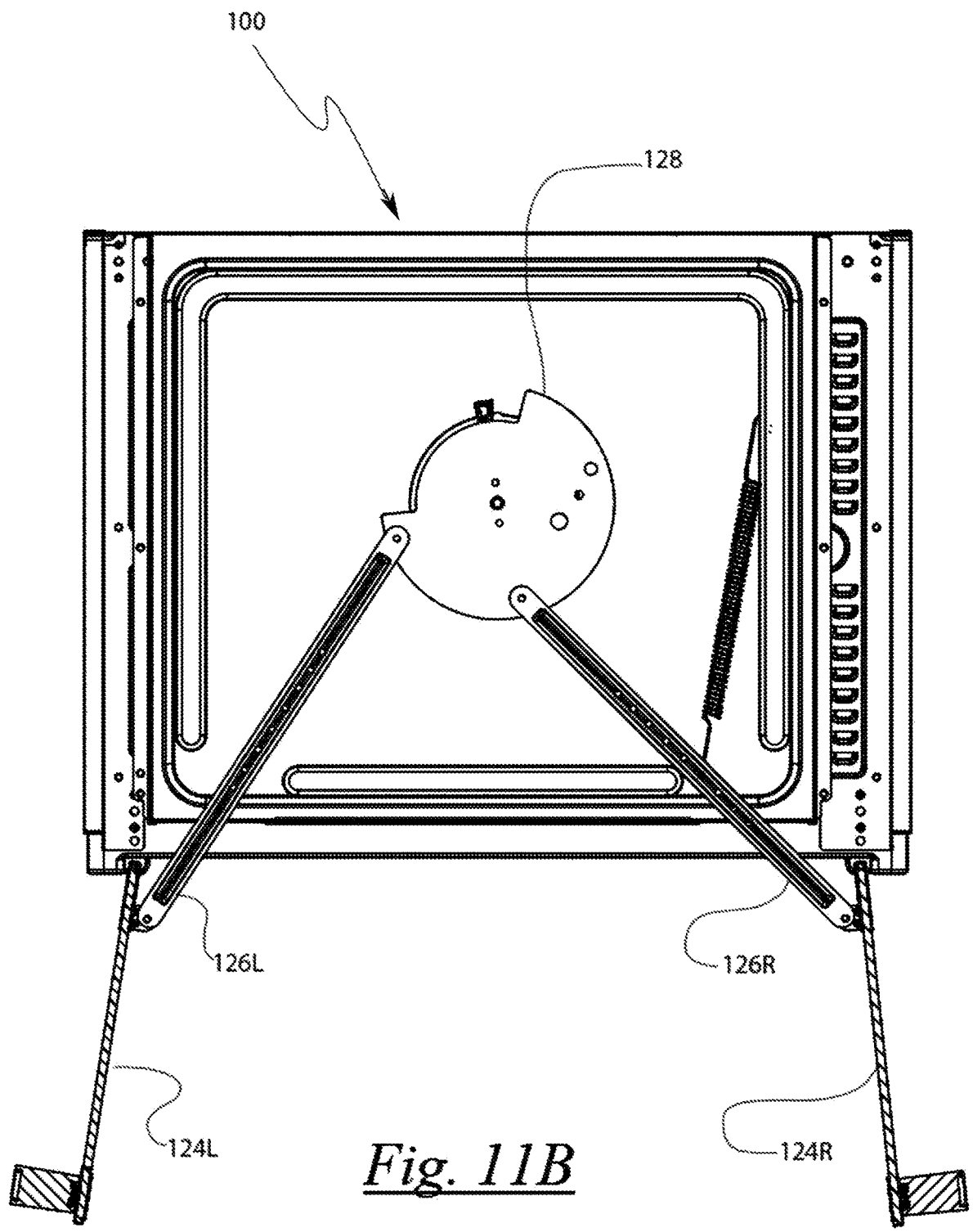
FIG. 11B is a cross-sectional view of the appliance of FIG. 1 in its opened state, taken at Line 11B-11B of FIG. 7B.
Figure 12A:
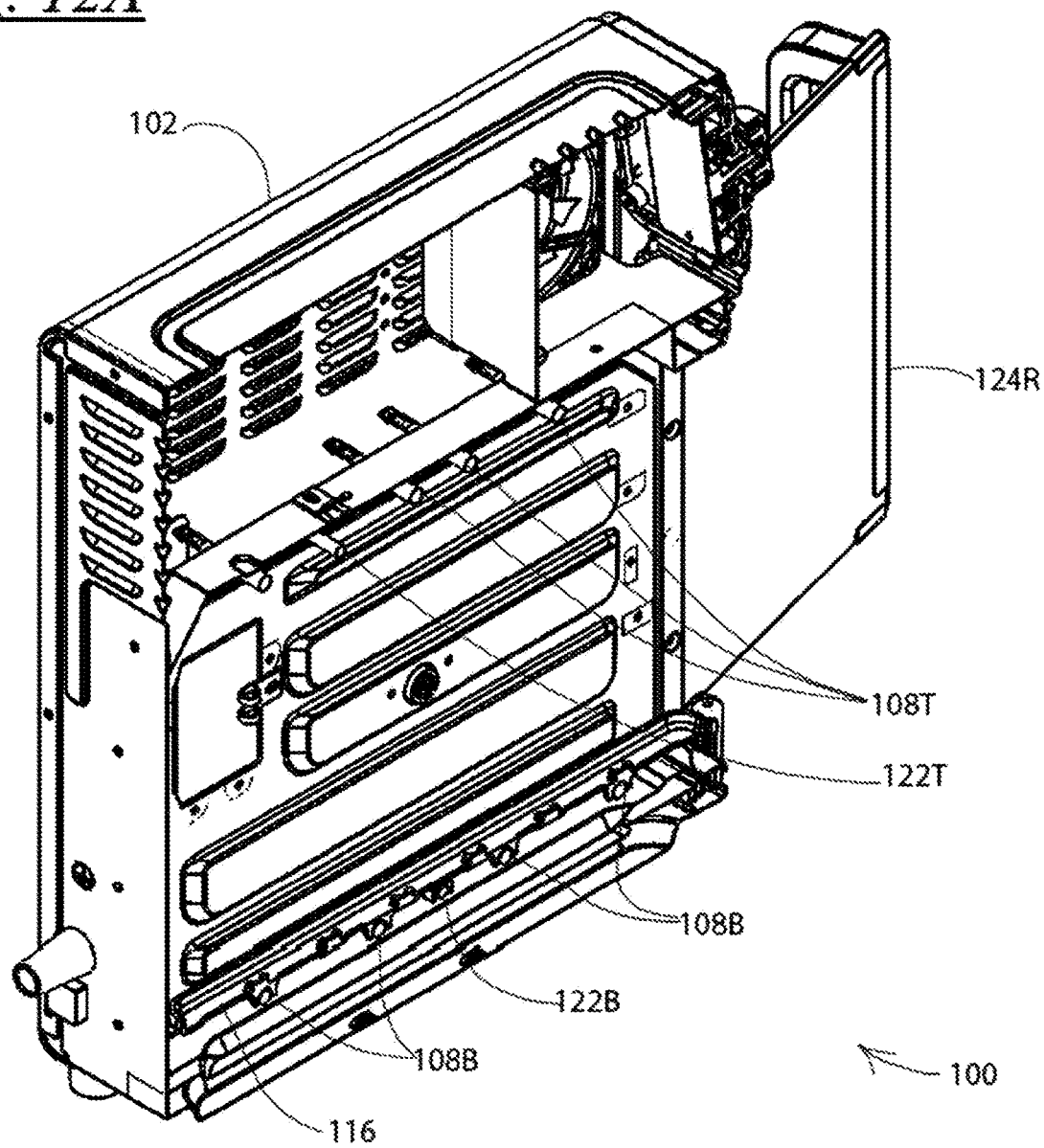
FIG. 12A is a cross-sectional perspective view of the appliance of FIG. 1 in its opened state, taken at Line 12A-12A of FIG. 7A.
Figure 12B:
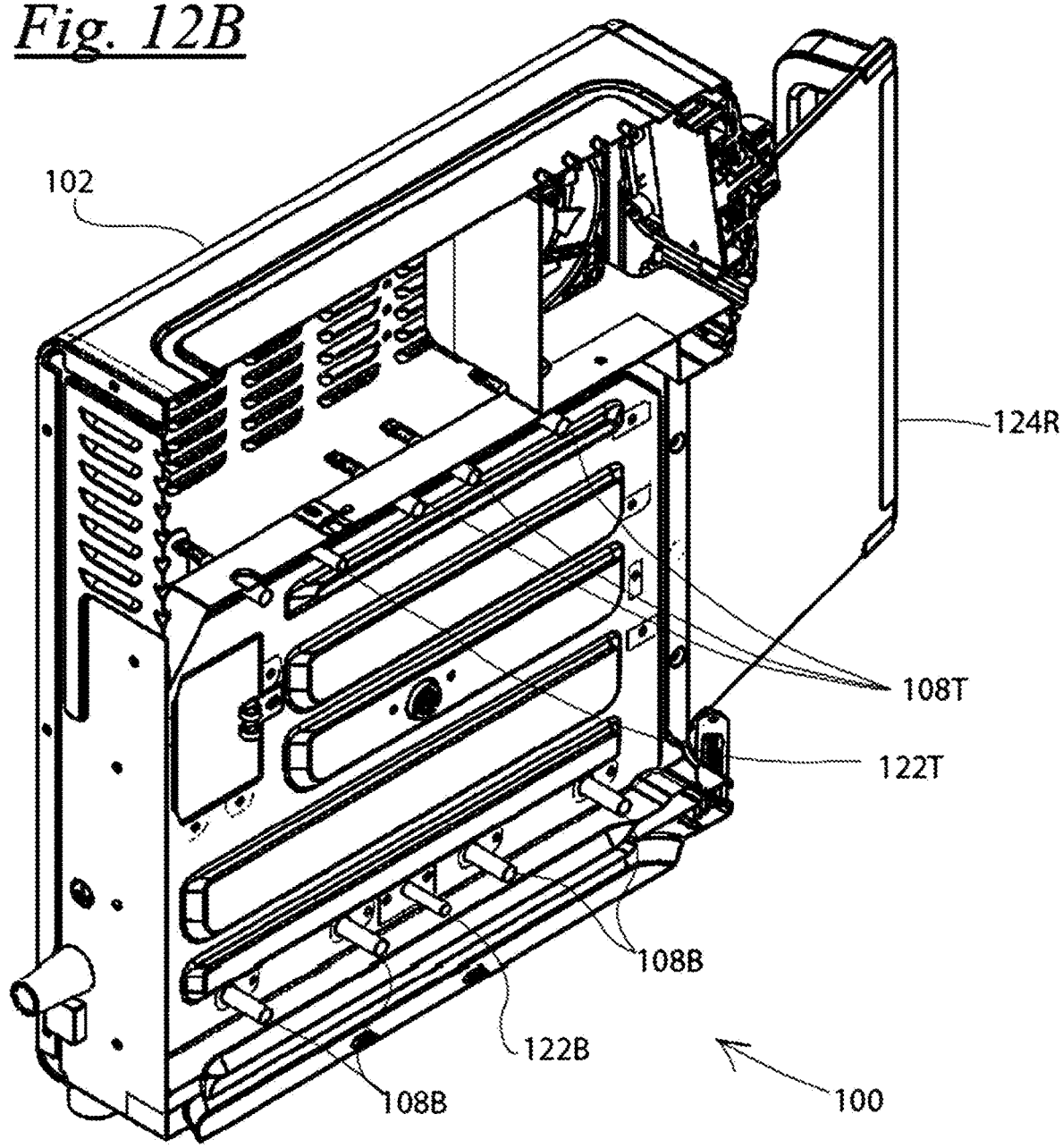
FIG. 12B is a cross-sectional perspective view of the appliance of FIG. 1 in its opened state with its griddle plate removed, taken at Line 12B-12B of FIG. 7B.
Figure 14:
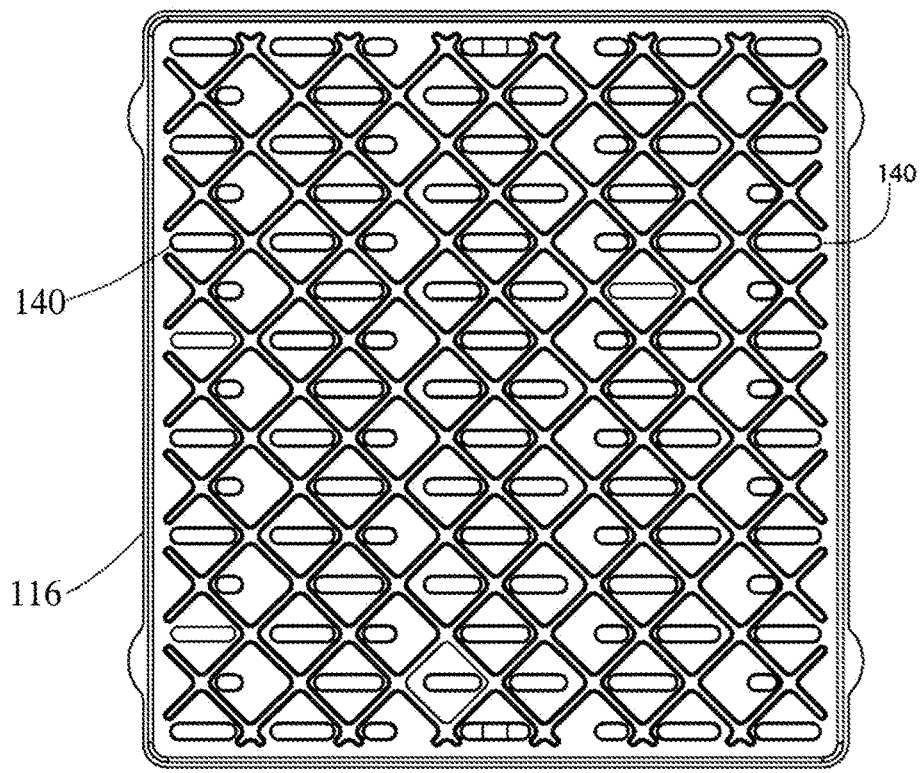
FIG. 14 is a top view of the removable griddle plate of the appliance of FIG. 1.
Figure 15:
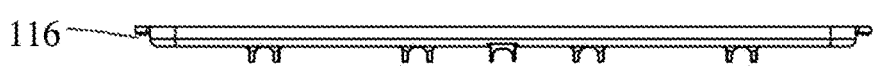
FIG. 15 is a front view of the removable griddle plate of the appliance of FIG. 1.
Figure 16:
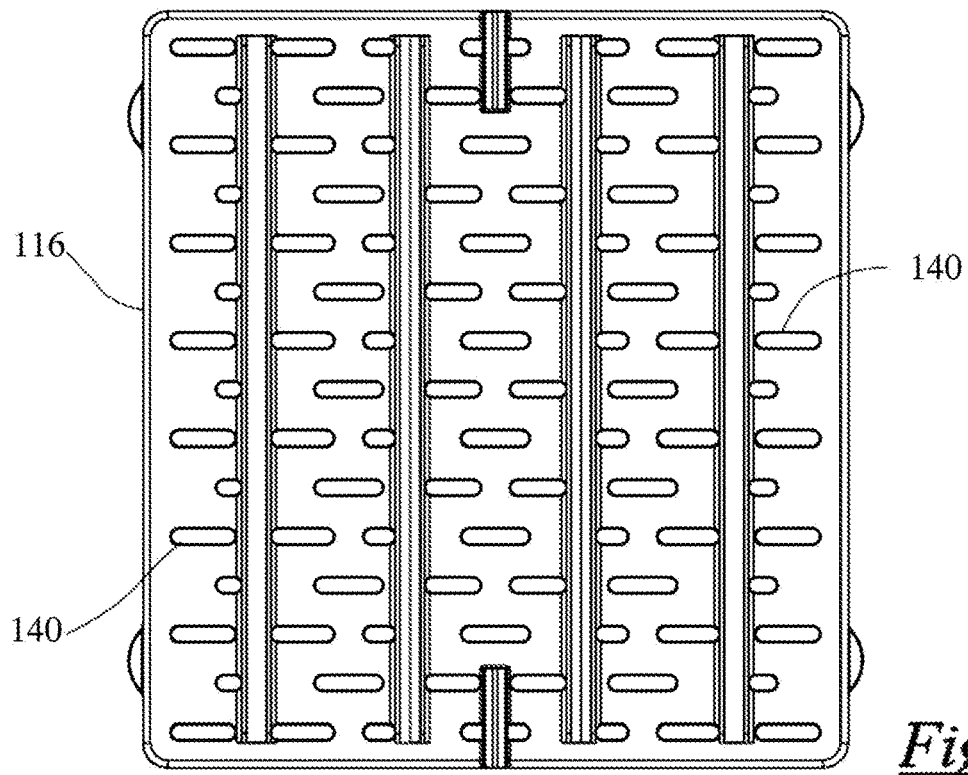
FIG. 16 is a bottom view of the removable griddle plate of the appliance of FIG. 1.

The symmetrical opening and closing of the left and right outwardly opening doors are achieved by the mechanism shown in FIGS. 11A and 11B. Link bars 126L and 126R connect the door to rotatable cam 128. An opening or closing force on either of the doors transmits through the associated link and causes rotation of the cam. That rotation of the cam transmits a force through the other link which causes equivalent opening or closing of the other door.

Having the first and second heating elements placed at the top and bottom of the cooking chamber, respectively, provides a space saving arrangement. In comparison to an existing appliance being able to cook a certain volume of food, this arrangement can either allow a smaller appliance to cook the certain volume of food or in a same-sized appliance to cook a larger volume of food. Because counterspace is so limited and valuable in most kitchens, this is no trivial benefit.

The combination or high-speed air agitation with both convective and contact heating is found to speed up cooking and improve the quality of the cooked food in both mouth-appeal and eye-appeal. Exposing the food to fast-flowing heated air during cooking results in a vaporization of the grease produced during cooking so that it does not burn on the griddle plate and cause smoke, and so that it can be removed from the food and cooking cavity and collected by the exhaust filter, which is adapted to capture both smoke and grease and be easily removed for cleaning or replacement. Such advances far exceed the performance of existing ovens, toaster ovens, griddles, convection ovens, air fryers, etc., beyond what one would normally anticipate, thereby providing an unexpected result not made obvious by those individual appliances of the prior art.

While the blower is shown positioned at the top of the cooking cavity, its position is not critical so long as it fully agitates the air throughout the cavity. It pulls fresh air into the cooking cavity and expels the hot, smokey, and greasy air out through exhaust filter 138 to provide rapid recycling of the air and constant interchange of the air inside the housing of the oven and outside air so that the food is cooked in clean air, which improved taste and appearance. As such, this arrangement, including the efficient exhaust filter, is especially well-adapted to reducing smoke and odor, as compared to exiting cooking ovens which agitate but do not recycle the air.

The temperature-controlled cookware device inside the cooking cavity in combination with a rapid air agitator provides an unexpectedly efficient means of reducing the smoke normally generated from such cooking, at least by removing the grease faster and more efficiently.

FIGS. 17-20 show a second exemplary cooking appliance 200 identical to the first except as follows. Cooking device 216 is removably disposed above and spaced slightly from the second electrical heating element by a small gap 108G such that heat radiating from the second electrical heating 208B element heats the griddle plate by radiation. The cooking device is shown as a grill plate in FIG. 17 but is shown schematically in FIG. 20 where is represents any acceptable cooking device such as a lidded or unlidded cooking pot, a slow-cooking pot, a rice pot, baking pan or tray, a grill plate, a griddle plate, etc.

The second temperature sensor 222B is disposed near to the bottom of the cooking chamber but not touching the griddle plate and is adapted to sense the air temperature near the bottom of the cooking chamber and report the same to the controller. The controller employs the temperatures sensed by the first and second temperature sensors in a variety of ways according to the cooking mode and type of food, as selected by the user.

For instance, during air frying, the temperatures of the two sensors may be averaged to determine the temperature with the chamber and then control the heating elements and blower equally according thereto. Or the temperatures of the two sensors may be compared and the controller may increase the heating wattage of the sensor realizing the lower temperature and/or vary the blower speed when one of the sensors realizes a certain temperature difference. This provides a more homogenous temperature throughout the chamber.

Or during grilling, the desired temperature at the lower sensor may be higher than that at the top sensor and the controller may increase energization of the lower heating element independently of the upper heating element when a temperature difference reaches a certain level or when the lower portion of the chamber gets too low.

The dual temperature control provides flexibility to cook a variety of foods in a variety of ways, such as a multicooker, while independently controlling two zones within the cooking chamber.

The lower temperature sensor and heating element enable control of the temperature of the grill plate (or whatever type of cooking device is used) while the upper temperature sensor, upper heating element and blower enable control of the air temperature in the upper portion of the cooking chamber to provide either baking, convection cooking, air frying, cooling, or keeping warm.

By sensing a sudden rise in the air temperature, the upper sensor can detect as soon as liquid in the cooking device has evaporated, which is an especially important feature when cooking such things as rice or other steamed foods or simmered foods such as in a lidded or unlidded cooking pot. The heating can be energized further until a temperature of 212 F is realized, then lowered to ensure a slower boil, then lowered even further once the temperature exceeds 450 F to provide and maintain a "keep warm" temperature.

The combination of the two heating elements and two sensors enables adjustability of heat from the above and below the food while making sure to keep liquids inside the cooker below boiling temperature.

Figure 45:
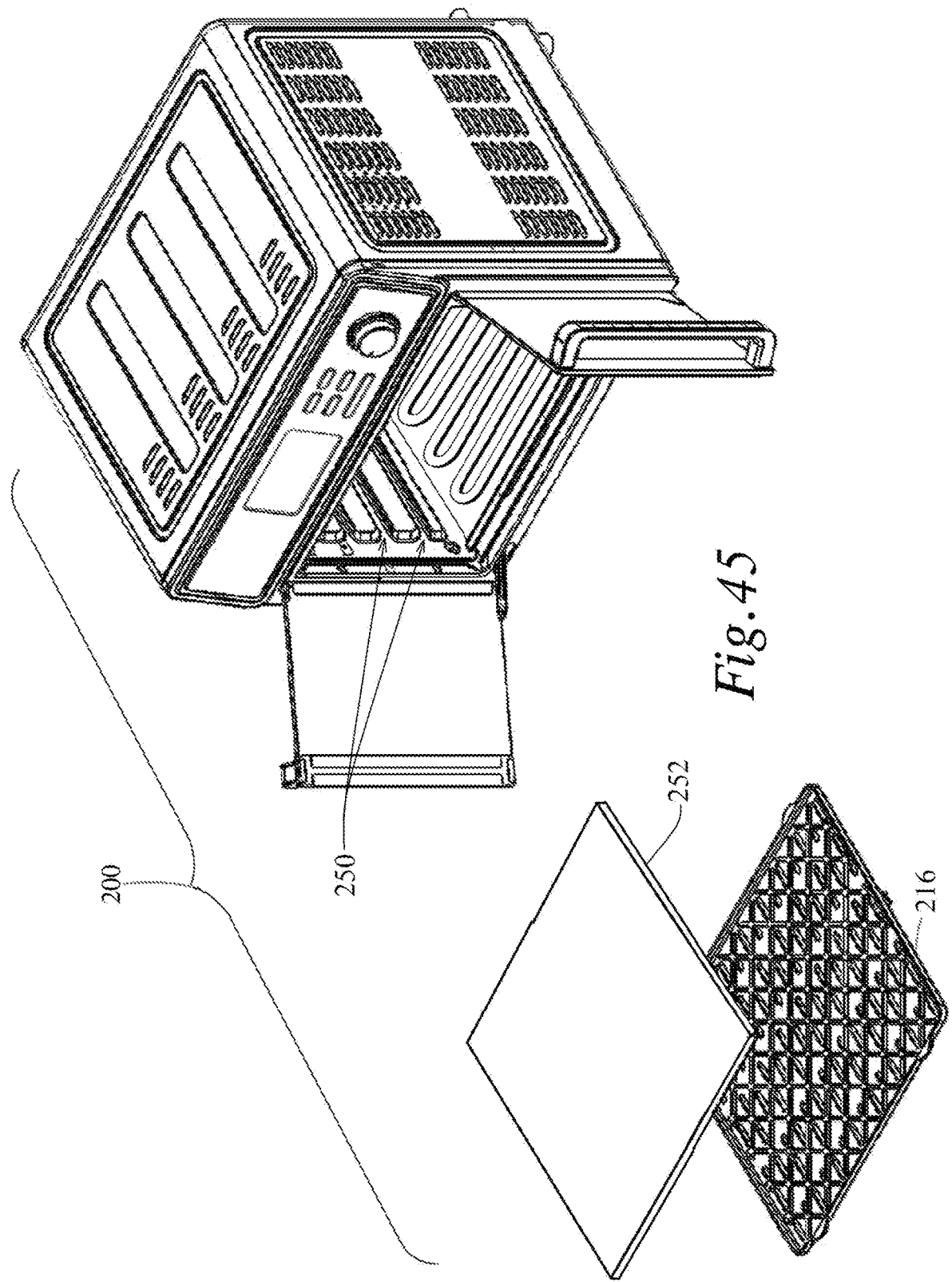
FIG. 45 is the same perspective view as FIG. 17 except with the divider plate added.
Figure 46:
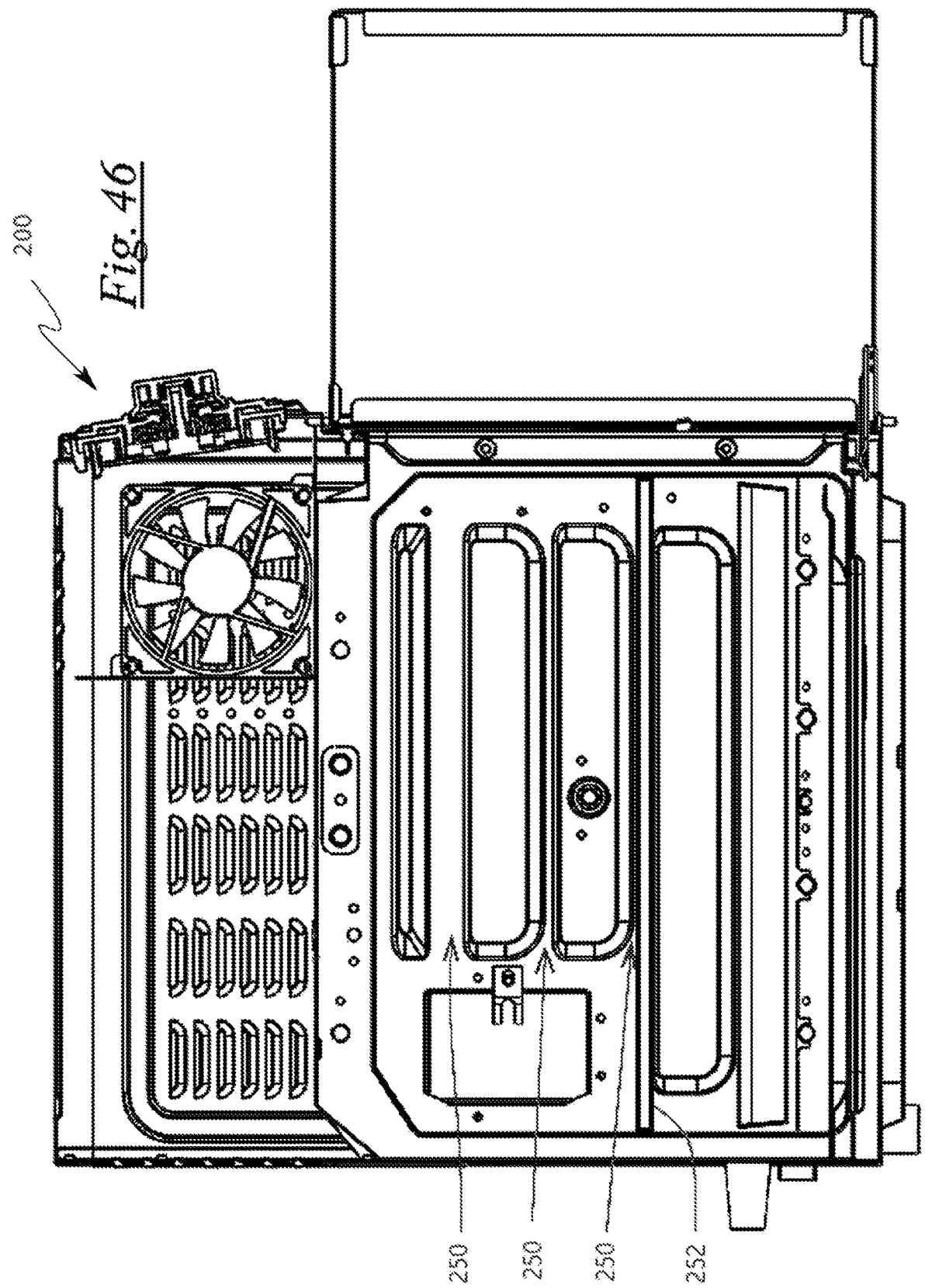
FIG. 46 is the same cross-sectional view as FIG. 20 except with the divider plate added.
Figure 47:
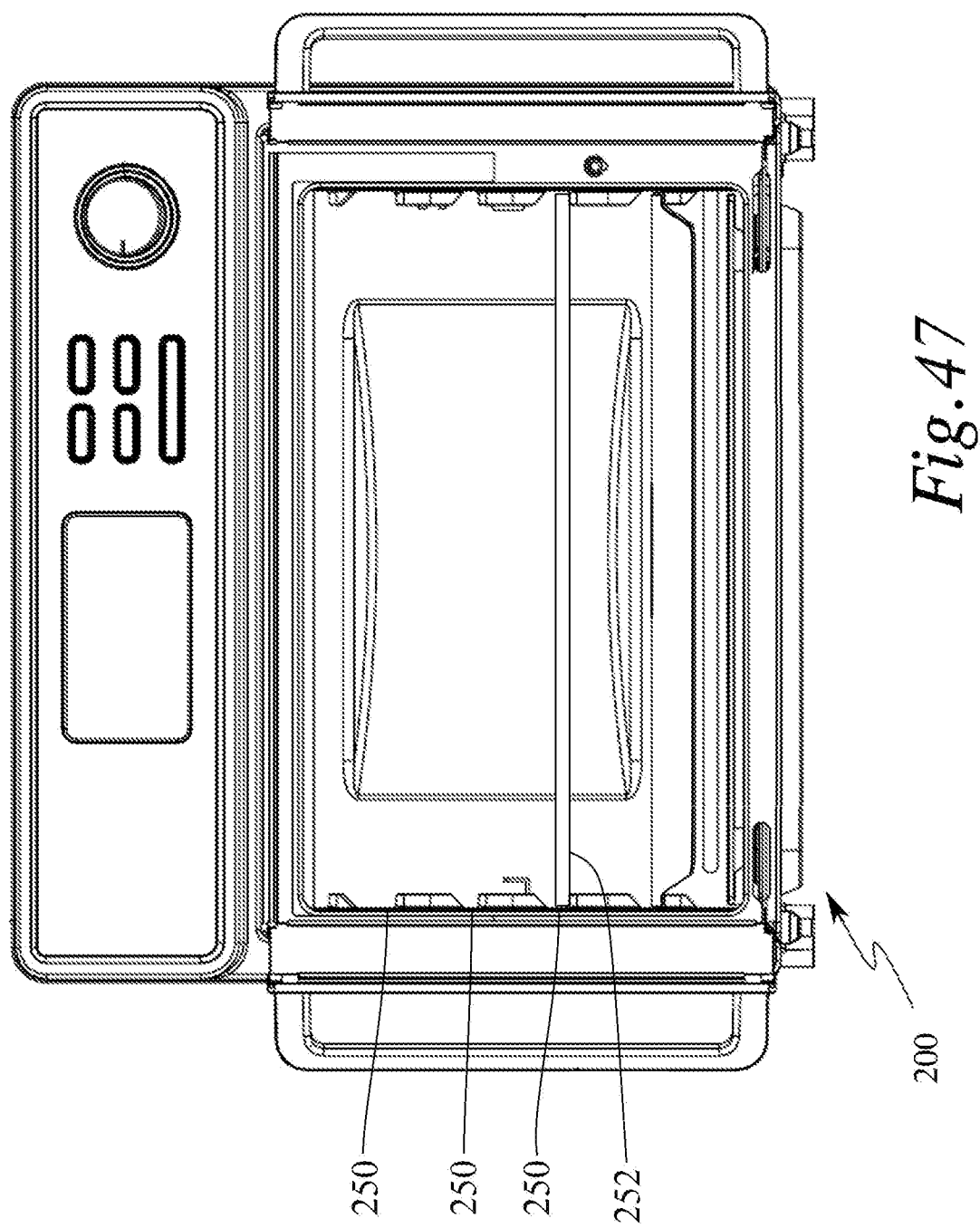
FIG. 47 is the same front view as FIG. 18 except with the divider plate added.

Additionally, as depicted in FIGS. 45 through 47, the use of the upper and lower independently-controllable heating systems and height adjustment slots 250 along with a divider plate 252 enables the ability to simultaneously cook two distinct types of foods in two distinct ways by isolating the upper and lower portions of the cooking chamber. French Fries may be air-fried in the upper portion while sliced onions and burgers may be contact-cooked in the lower portion, each under its optimal cooking conditions.

Dual measurement of the temperature at different location within the cooking chamber also enables more precise temperature control. When both sensors indicate the same temperature, it is a more reliable indication that both sensors are indicating the correct temperature.

And localized readings of the temperatures can be beneficial in other ways. The temperature read at the top and bottom of the chamber can be averaged or proportionately balanced, which may be used to optimize cooking according to the type of food being cooked or the way it is being cooked; baking may require more heating of the lower portion of the cavity, while broiling may require more heating of the upper portion.

When the lower temperature sensor is adapted to physically contact the cooking device, but the upper temperature sensor is adapted to control both upper and lower heating, cooking can be controlled as desired without the need for actually measuring the food temperature because a reasonably accurate indication of the food temperature can be estimated, and the cooking can be controlled according thereto. Such things as insertable thermometers are not required, and the food can be properly cooked, and cooking can be terminated automatically according to the estimated food temperature.

For both embodiments, it is important that the lower heating element radiates or conducts heat evenly across the bottom of the cooking chamber, and in the case where the lower heating element physically contacts and supports the cooking device, that the element have a foot-print capable of providing even heating and such support. It is found that this is best accomplished by an element having a foot-print that is greater than 40 percent of the depth and width of the cooking device so that the cooking device is stably supported and unlikely to tip.

Figure 17:
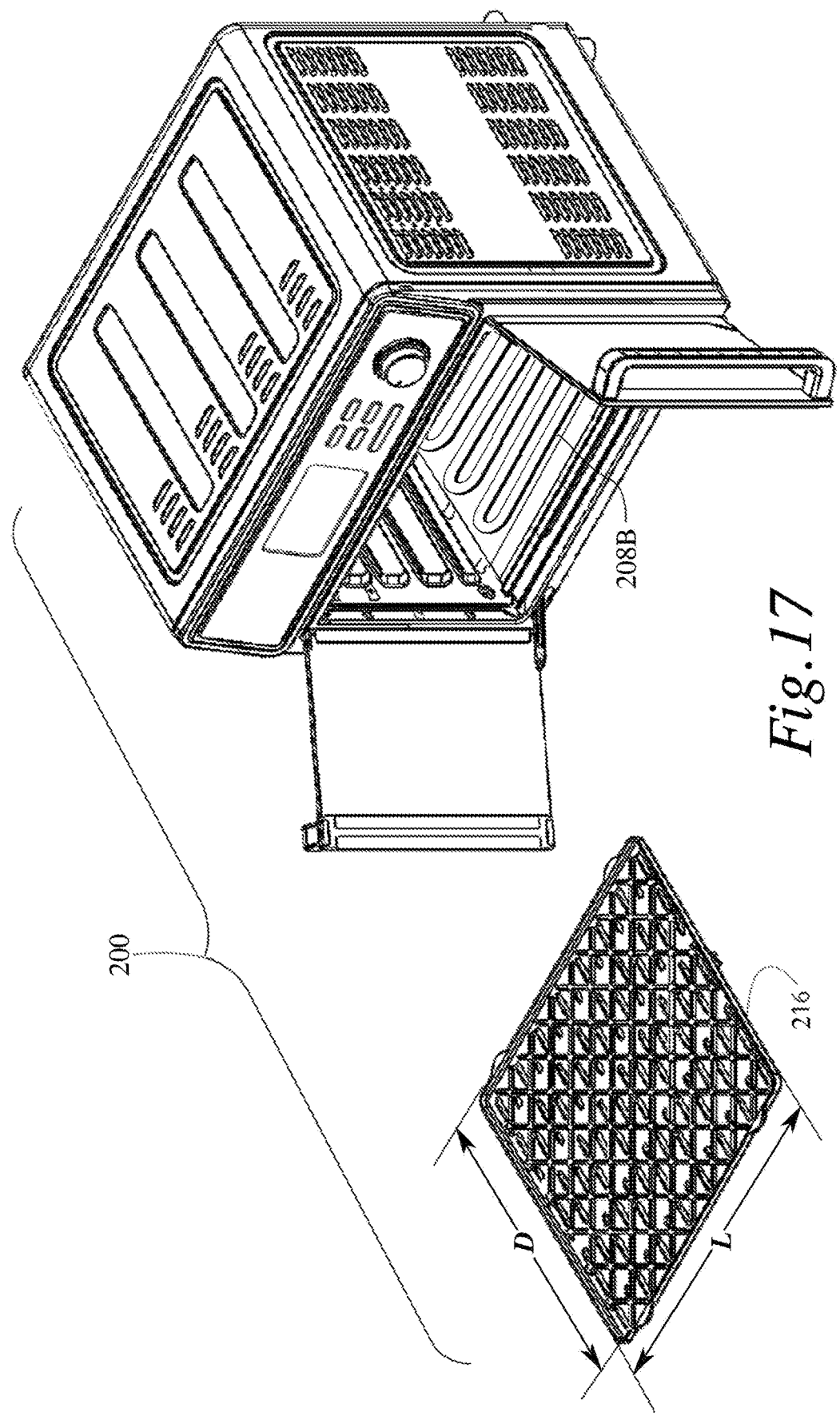
FIG. 17 is a perspective view of a second exemplary cooking appliance in its opened state with its griddle plate removed.
Figure 18:
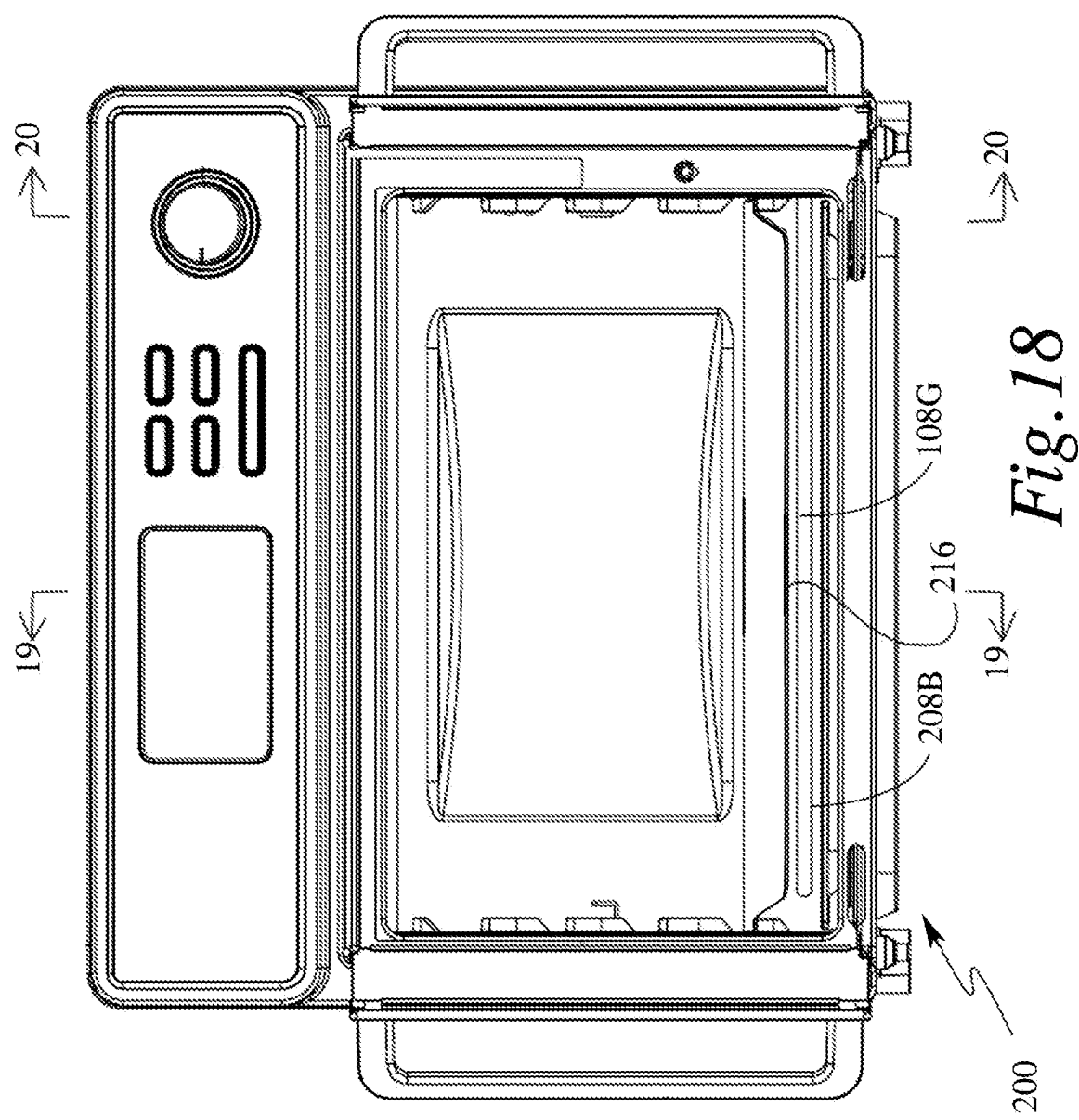
FIG. 18 is a front view of the appliance of FIG. 17 in its opened state.
Figure 19:
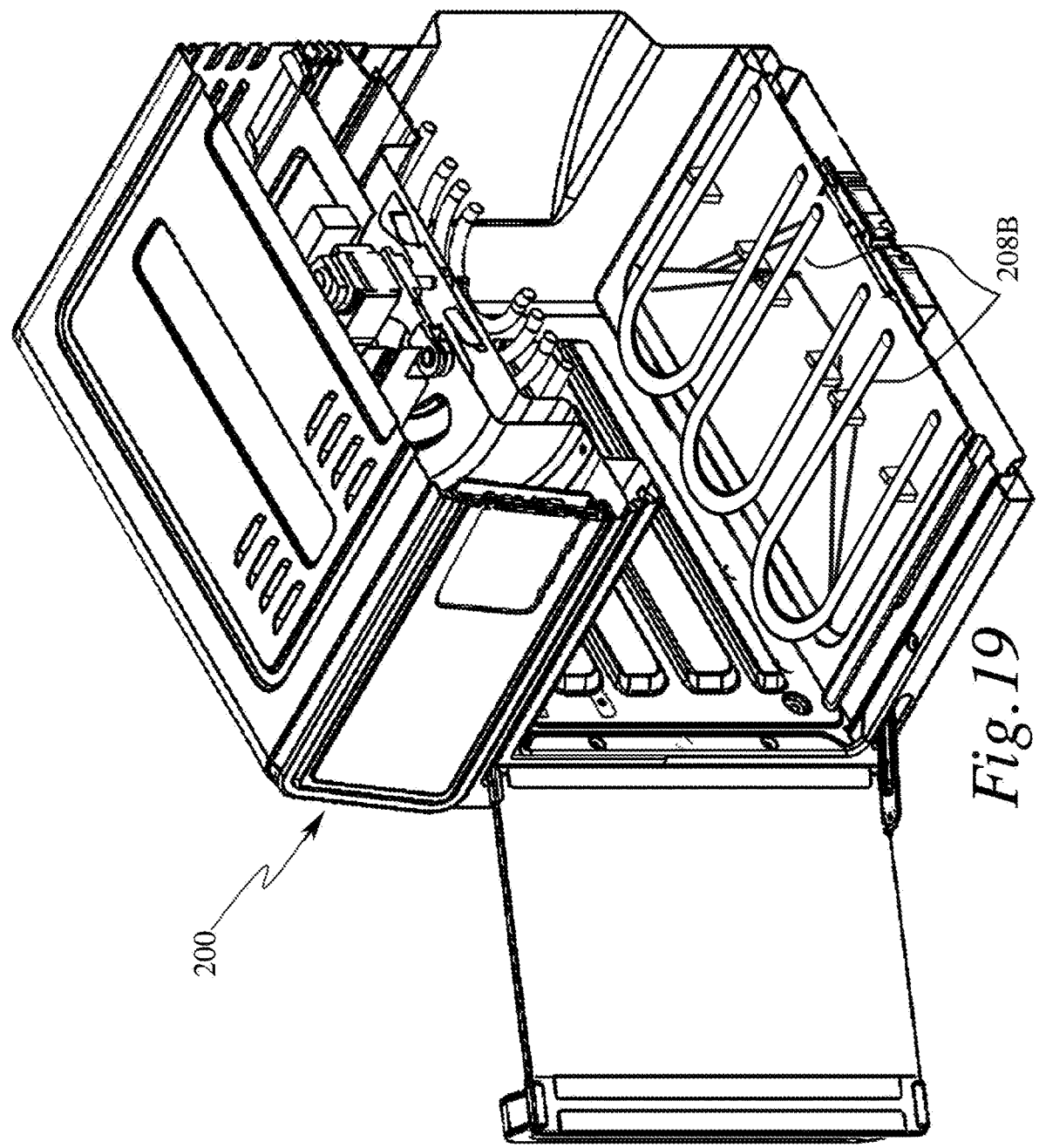
FIG. 19 is a perspective cross-sectional view of the appliance of FIG. 17 in its opened state, taken at Line 19-19 of FIG. 18.
Figure 20:
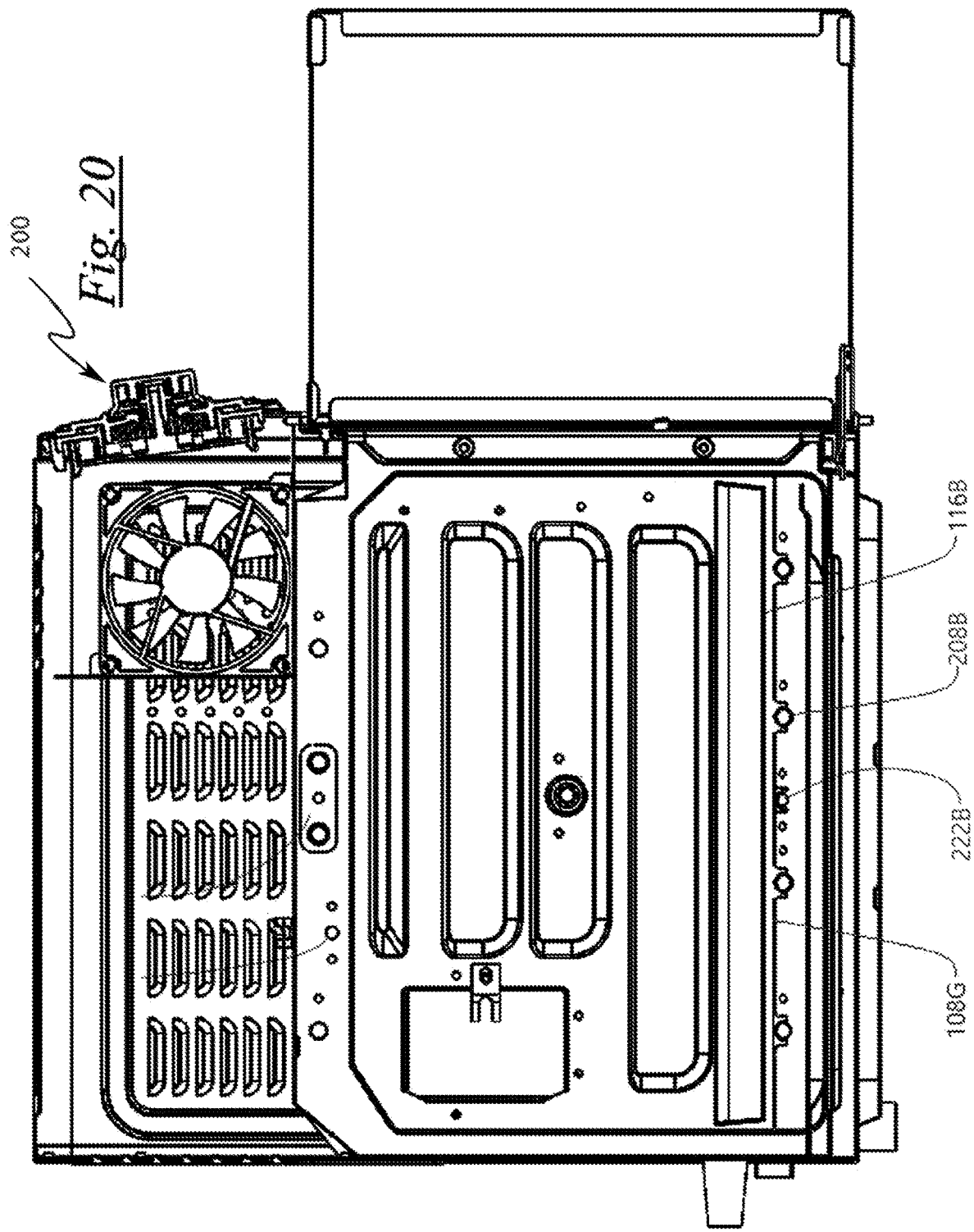
FIG. 20 is a cross-sectional view of the appliance of FIG. 17 in its opened state, taken at Line 20-20 of FIG. 18.
Figure 21:
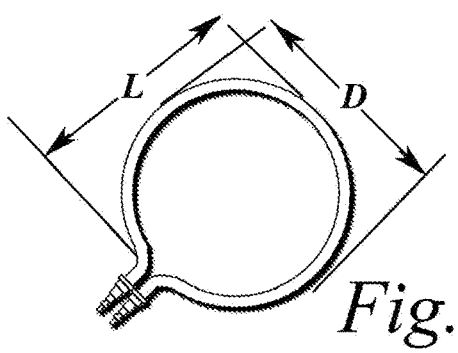
FIG. 21 is a perspective view of a typical prior art circular tubular heating element.
Figure 22:
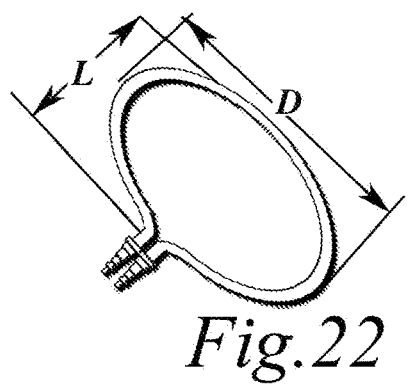
FIG. 22 is a perspective view of a typical prior art oval tubular heating element.

In the definition most relevant, Merriam Webster defines "foot-print" as "the area on a surface covered by something". The term foot-print as used herein follows that definition with the further limitation that the area is the product of an item's length and depth. The length and depth are measurements to be taken from the item's top view such as in FIG. 3. FIG. 17 shows the length L and depth D of the grill plate as those terms are herein meant and FIGS. 21 through 44 show the length L and Depth D of each heating element shown therein. So for instance if the grill plate is 10" deep and 12" long, it has a foot-print of 120 sq in. The lower heating element's foot-print should thus be preferably at least 48 sq in.

Figure 23:
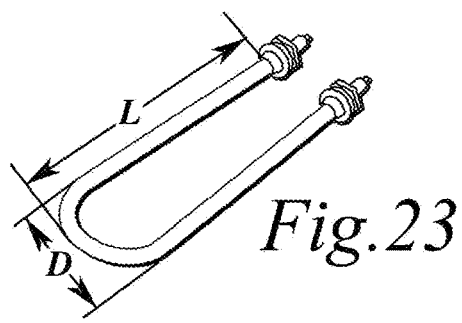
FIG. 23 is a perspective view of a typical prior art U-shaped tubular heating element.
Figure 24:
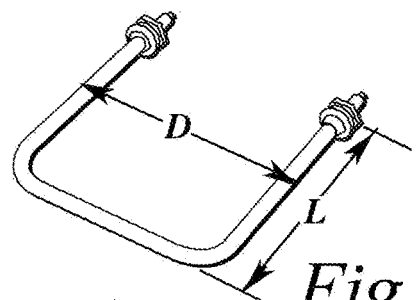
FIG. 24 is a perspective view of a typical prior art wide U-shaped tubular heating element.
Figure 25:
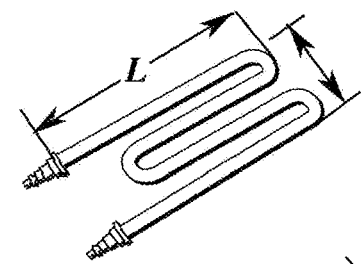
FIG. 25 is a perspective view of a typical prior art M-shaped tubular heating element.
Figure 26:
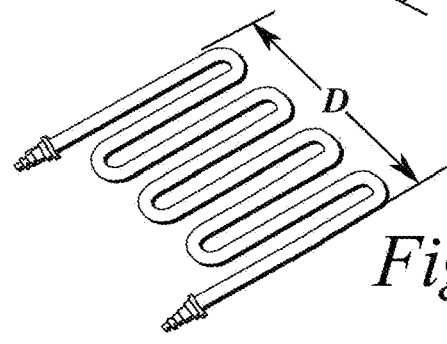
FIG. 26 is a perspective view of a typical prior art multi-M-shaped tubular heating element.
Figure 27:
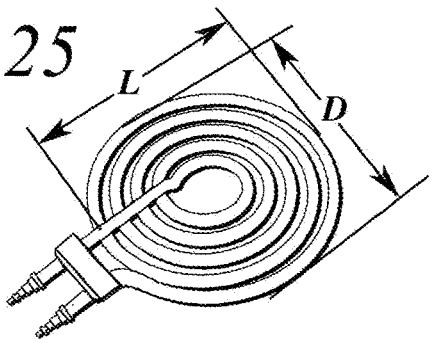
FIG. 27 is a perspective view of a typical prior art spiral tubular heating element.
Figure 28:
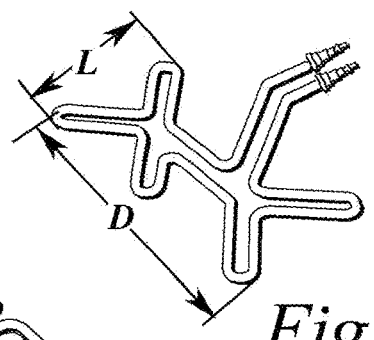
FIG. 28 is a perspective view of a typical prior art animal-shaped heating element.
Figure 29:
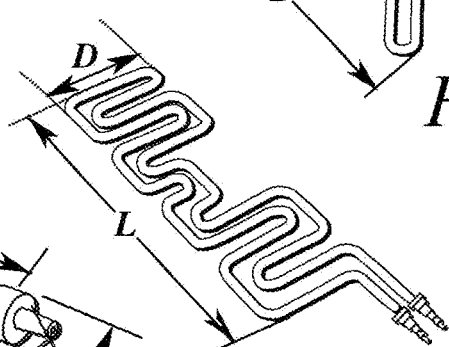
FIG. 29 is a perspective view of a typical prior art snake-shaped heating element.
Figure 30:
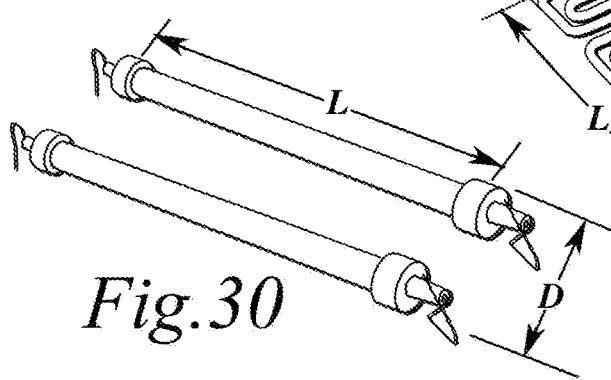
FIG. 30 is a perspective view of a pair of typical prior art quartz tubular heating elements.
Figure 31:
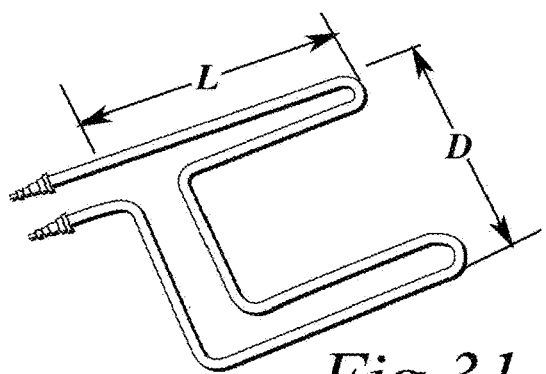
FIG. 31 is a perspective view of a typical prior art offset Y-shaped tubular heating element.
Figure 32:
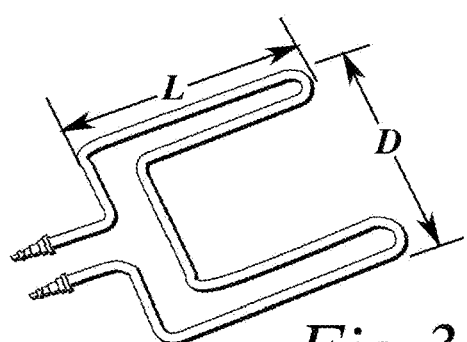
FIG. 32 is a perspective view of a typical prior art Y-shaped tubular heating element.
Figure 33:
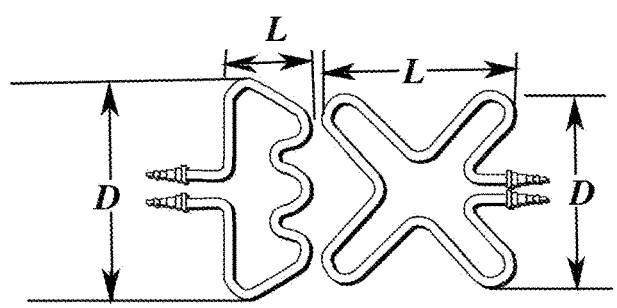
FIG. 33 is a perspective view of a typical prior art scalloped tubular heating element.
Figure 34:
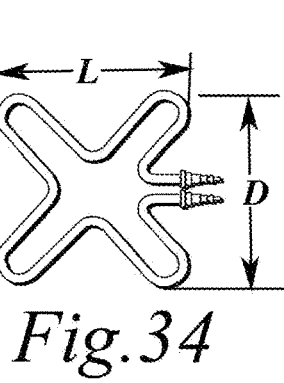
FIG. 34 is a perspective view of a typical prior art X-shaped tubular heating element.
Figure 35:
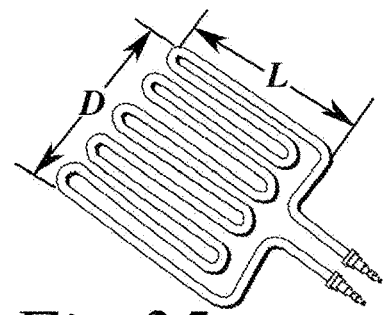
FIG. 35 is a perspective view of a typical prior art multi-loop Y-shaped tubular heating element.
Figure 36:
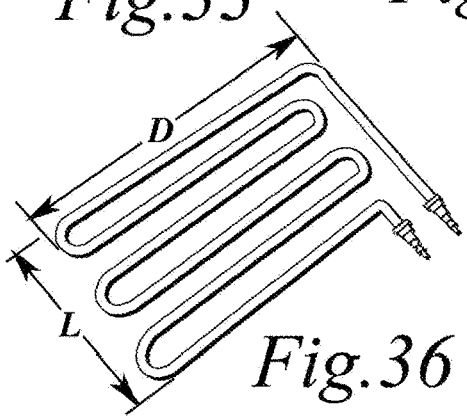
FIG. 36 is a perspective view of a typical prior art offset multi-loop Y-shaped tubular heating element.
Figure 37:
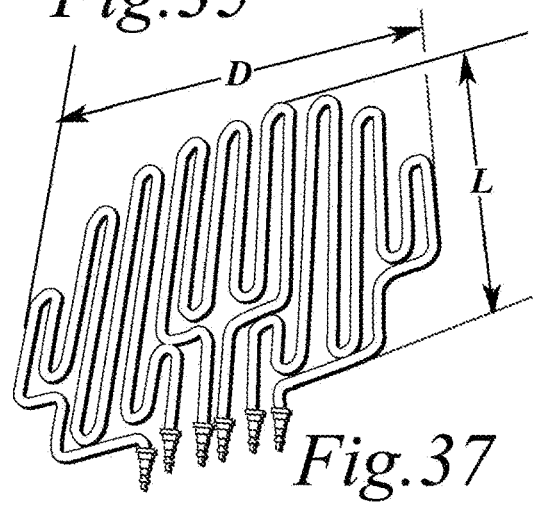
FIG. 37 is a perspective view of a typical prior art fan-shaped tubular heating element.
Figure 38:
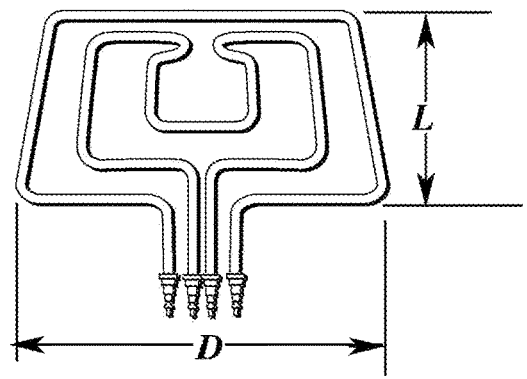
FIG. 38 is a perspective view of a typical prior art concentric ringed tubular heating element.
Figure 39:
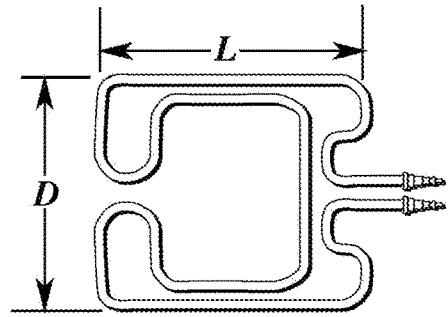
FIG. 39 is a perspective view of a typical prior art C-shaped tubular heating element.
Figure 40:
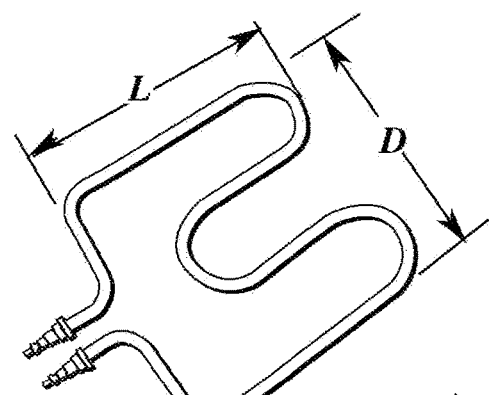
FIG. 40 is a perspective view of a typical prior art looped Y-shaped tubular heating element.
Figure 41:
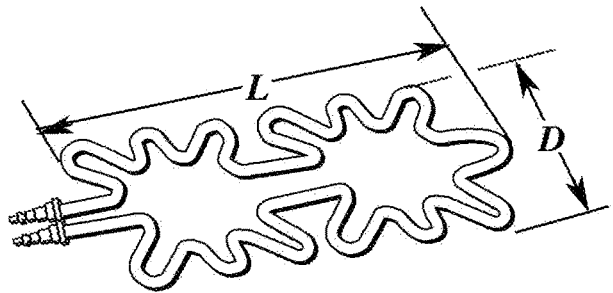
FIG. 41 is a perspective view of a typical prior art double star-shaped tubular heating element.
Figure 42:
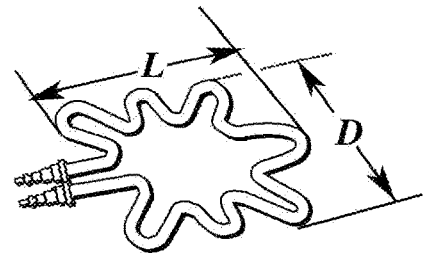
FIG. 42 is a perspective view of a typical prior art star-shaped tubular heating element.
Figure 43:
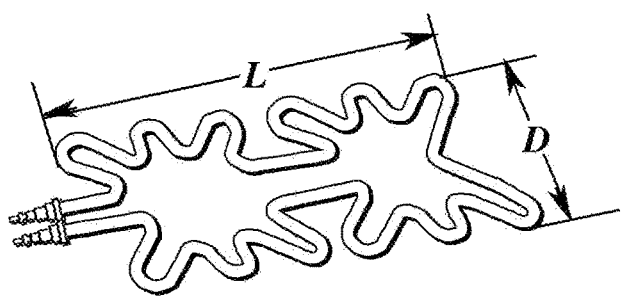
FIG. 43 is a perspective view of a typical prior art double burst-shaped tubular heating element.
Figure 44:
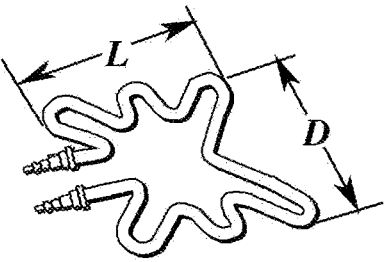
FIG. 44 is a perspective view of a typical prior art burst-shaped tubular heating element

A heating element that is say 6" deep and 8" long is thereby clearly adequate because it has a foot-print of 48", 40% of the grill plate's foot-print. A heating element that is say 5" deep and 10" long is clearly adequate because it has a foot-print of 50 sq in, approximately 42% of the grill plate's foot-print. A heating element that is say 5" deep and 9" long is thereby only marginally adequate because it has a foot-print of 45 sq in, only 37% of the grill plate's foot-print. A heating element that is say 5" deep and 8" long is less than preferable because it has a foot-print of 40 sq in, only 33% of the grill plate's foot-print If more than one coplanar lower heating element is employed, such as say if two of the U-shaped tubular heating elements shown in FIG. 23 are positioned side-by-side, then the relevant foot-print is the overall foot-print of the group including any gap between the elements . . . the product of length L and the total depth 2D plus the gap. This is best demonstrated in FIG. 30.

Any of a myriad of heating element types may serve this purpose provided they are adequately sized and positioned, such as, but not limited to, those shown in FIGS. 21 through 44, which are identified by their commonly-known names in the previously listed Brief Description of the Drawings and will not be repeated here for brevity. It should be noted that the definitions of the names of those heating element types includes not only those exactly as shown but also obvious or insignificant/irrelevant variations in the shapes and sizes thereof.

While the invention has been shown and described with reference to specific exemplary embodiments, it should be understood by those skilled in the art that various changes in form and detail may be made without departing from the spirit and scope of the invention, and that the invention should therefore only be limited according to the following claims, including all equivalent interpretation to which they are entitled.

The invention claimed is:

1. A cooking appliance comprising;
a housing defining a cooking cavity having opposed right and left internal side walls, each sidewall having a plurality of vertically-spaced-apart horizontal channels;
a first air heating element disposed adjacent a top of the cooking cavity;
a second heating element disposed adjacent a bottom of the cooking cavity;
a first temperature sensor adapted to sense a temperature of air within an upper portion of the cooking cavity;
a second temperature sensor adapted to sense a temperature of air within a lower portion of the cooking cavity;
a blower arranged to agitate air within the cooking cavity;
one of a grill plate and a griddle plate adapted for removably sliding into selected and vertically-aligned right and left pairs of the horizontal channels to be directly supported thereby in a selected one of a plurality of vertical positions in spaced relationship above the second heating element including a lowest vertical position adjacent to the second heating element and in thermal communication therewith, with a gap therebetween, such that radiant-cooking of food on the one of a grill plate and a griddle plate is selectively provided thereby; and
a controller adapted to manually receive cooking parameters from a user and sensed temperature information from the first and second temperature sensors and to selectively control the heating elements and the blower according thereto;
wherein the controller is adapted to manually receive cooking parameters from the user and sensed temperature information from the first and second temperature sensors and to independently and selectively control the heating elements and the blower according thereto.

2. The cooking appliance of claim 1 wherein the controller is further adapted to independently and selectively control the heating elements and the blower according to a comparison of the temperatures sensed by the first and second temperature sensors.

3. The cooking appliance of claim 2 wherein the one of a grill plate and a griddle plate has a first foot-print with a first area and the second heating element has a second foot-print with a second area at least 40 percent of the first area.

4. The cooking appliance of claim 3 wherein the controller is further adapted to independently and selectively control the heating elements and the blower according to an average of the temperatures sensed by the first and second temperature sensors.

5. The cooking appliance of claim 4 wherein the one of a grill plate and a griddle plate has a first foot-print with a first area and the second heating element has a second foot-print with a second area at least 40 percent of the first area.

6. A cooking appliance comprising;
a housing defining a cooking cavity having opposed right and left internal side walls, each sidewall having a plurality of vertically-spaced-apart horizontal channels;
a first air heating element disposed adjacent a top of the cooking cavity;
a second heating element disposed adjacent a bottom of the cooking cavity;
a first temperature sensor adapted to sense a temperature of air within an upper portion of the cooking cavity;
a second temperature sensor adapted to sense a temperature of air within a lower portion of the cooking cavity;

a blower arranged to agitate air within the cooking cavity;
one of a grill plate and a griddle plate adapted for removably sliding into selected and vertically-aligned right and left pairs of the horizontal channels to be directly supported thereby in a selected one of a plurality of vertical positions in spaced relationship atop the second heating element including a lowest vertical position adjacent to the second heating element and in physical contact and thermal communication therewith such that contact-cooking of food on the one of a grill plate and a griddle plate is selectively provided thereby; and
a controller adapted to manually receive cooking parameters from a user and sensed temperature information from the first and second temperature sensors; and to independently and selectively control the heating elements and the blower according thereto.

7. The cooking appliance of claim 6 further comprising a second temperature sensor adapted to sense a temperature of air within a lower portion of the cooking cavity;
and wherein a controller adapted to manually receive cooking parameters from a user and sensed temperature information from the first and second temperature sensors; and to selectively control the heating elements and the blower according thereto.

8. The cooking appliance of claim 7 wherein the controller is further adapted to independently and selectively control the heating elements and the blower according to a comparison of the temperatures sensed by the first and second temperature sensors.

9. The cooking appliance of claim 8 wherein the one of a grill plate and a griddle plate has a first foot-print with a first area and the second heating element has a second foot-print with a second area at least 40 percent of the first area.

10. The cooking appliance of claim 9 wherein the controller is further adapted to independently and selectively control the heating elements and the blower according to an average of the temperatures sensed by the first and second temperature sensors.

11. The cooking appliance of claim 10 wherein the one of a grill plate and a griddle plate has a first foot-print with a first area and the second heating element has a second foot-print with a second area at least 40 percent of the first area.

12. The cooking appliance of claim 6 wherein the second heating element is of a type taken from the group consisting of one or more straight tubular heating elements, one or more circular tubular heating elements, one or more oval tubular heating elements, one or more U-shaped tubular heating elements, one or more wide U-shaped tubular heating elements, one or more M-shaped tubular heating elements, one or more multi M-shaped tubular heating elements, one or more spiral tubular heating elements, one or more animal-shaped heating elements, one or more snake-shaped heating elements, one or more quartz tubular heating elements, one or more offset Y-shaped tubular heating elements, one or more Y-shaped tubular heating elements, one or more scalloped tubular heating elements, one or more X-shaped tubular heating elements, one or more multi-loop Y-shaped tubular heating elements, one or more offset multi-loop Y-shaped tubular heating elements, one or more fan-shaped tubular heating elements, one or more concentric ringed tubular heating elements, one or more C-shaped tubular heating elements, one or more looped Y-shaped tubular heating elements, one or more double star-shaped tubular heating elements, one or more star-shaped tubular heating elements, one or more double burst-shaped tubular heating elements, and one or more burst-shaped tubular heating elements.

13. A cooking appliance comprising;
a housing defining a cooking cavity having opposed right and left internal side walls, each sidewall having a plurality of vertically-spaced-apart horizontal channels;
a first air heating element disposed adjacent a top of the cooking cavity;
a second heating element disposed adjacent a bottom of the cooking cavity;
a temperature sensor disposed adapted to sense a temperature of air within the cooking cavity;
a blower arranged to agitate air within the cooking cavity;
one of a grill plate and a griddle plate adapted for removably sliding into selected and vertically-aligned right and left pairs of the horizontal channels to be directly supported thereby in a selected one of a plurality of vertical positions in spaced relationship atop the second heating element including a lowest vertical position adjacent to the second heating element and in physical contact and thermal communication therewith such that contact-cooking of food on the one of a grill plate and a griddle plate is selectively provided thereby; and
a controller adapted to manually receive cooking parameters from a user and sensed temperature information from the temperature sensor; and to independently and selectively control the heating elements and the blower according thereto; wherein the one of a grill plate and a griddle plate has a first foot-print with a first area and the second heating element has a second foot-print with a second area at least 40 percent of the area of the first area.

14. The cooking appliance of claim 13 wherein the second heating element is of a type taken from the group consisting of one or more straight tubular heating elements, one or more circular tubular heating elements, one or more oval tubular heating elements, one or more U-shaped tubular heating elements, one or more wide U-shaped tubular heating elements, one or more M-shaped tubular heating elements, one or more multi M-shaped tubular heating elements, one or more spiral tubular heating elements, one or more animal-shaped heating elements, one or more snake-shaped heating elements, one or more quartz tubular heating elements, one or more offset Y-shaped tubular heating elements, one or more Y-shaped tubular heating elements, one or more scalloped tubular heating elements, one or more X-shaped tubular heating elements, one or more multi-loop Y-shaped tubular heating elements, one or more offset multi-loop Y-shaped tubular heating elements, one or more fan-shaped tubular heating elements, one or more concentric ringed tubular heating elements, one or more C-shaped tubular heating elements, one or more looped Y-shaped tubular heating elements, one or more double star-shaped tubular heating elements, one or more star-shaped tubular heating elements, one or more double burst-shaped tubular heating elements, and one or more burst-shaped tubular heating elements.

15. A cooking appliance comprising;
a housing defining a cooking cavity having opposed right and left internal side walls, each sidewall having a plurality of vertically-spaced-apart horizontal channels;
a door arrangement for selectively accessing the cooking compartment;

a first air heating element disposed adjacent a top of the cooking cavity;

a second heating element disposed adjacent a bottom of the cooking cavity;

a first temperature sensor adapted to sense a temperature of the air within an upper portion of the cooking cavity;

a second temperature sensor adapted to sense a temperature of air within a lower portion of the cooking cavity;

a blower arranged to agitate air within the cooking cavity;

one of a grill plate and a griddle plate adapted for removably sliding into selected and vertically-aligned right and left pairs of the horizontal channels to be directly supported thereby in a selected one of a plurality of vertical positions in spaced relationship above the second heating element including a lowest vertical position adjacent to the second heating element and in thermal communication therewith such that cooking of food on the one of a grill plate and a griddle plate is selectively provided thereby, and adjacent the second temperature sensor, such that contact temperature sensing of food on the one of a grill plate and a griddle plate is enabled thereby; and a controller adapted to manually receive cooking parameters from a user and sensed temperature information from the first and second temperature sensors; and to independently and selectively control the heating elements and the blower according thereto.

16. The cooking appliance of claim 15 wherein the one of a grill plate and a griddle plate has a first foot-print with a first area and the second heating element has a second foot-print with a second area at least 40 percent of the first area.

17. The cooking appliance of claim 15 wherein the second heating element is of a type taken from the group consisting of one or more straight tubular heating elements, one or more circular tubular heating elements, one or more oval tubular heating elements, one or more U-shaped tubular heating elements, one or more wide U-shaped tubular heating elements, one or more M-shaped tubular heating elements, one or more multi M-shaped tubular heating elements, one or more spiral tubular heating elements, one or more animal-shaped heating elements, one or more snake-shaped heating elements, one or more quartz tubular heating elements, one or more offset Y-shaped tubular heating elements, one or more Y-shaped tubular heating elements, one or more scalloped tubular heating elements, one or more X-shaped tubular heating elements, one or more multi-loop Y-shaped tubular heating elements, one or more offset multi-loop Y-shaped tubular heating elements, one or more fan-shaped tubular heating elements, one or more concentric ringed tubular heating elements, one or more C-shaped tubular heating elements, one or more looped Y-shaped tubular heating elements, one or more double star-shaped tubular heating elements, one or more star-shaped tubular heating elements, one or more double burst-shaped tubular heating elements, and one or more burst-shaped tubular heating elements.

18. The cooking appliance of claim 15 wherein the controller connected to the heating elements and comprising a timer and adapted to independently and selectively control, in cooperation with the timer and according to the cooking parameters and the sensed temperature information one or more from the group consisting of;

one or both of the blower's on/off state and the blower's speed;

one or both of the first heating element's on/off state and the blower's speed; and one or both of the second heating element's on/off state and the blower's speed.

19. The cooking appliance of claim 18 wherein the one of a grill plate and a griddle plate has a first foot-print with a first area and the second heating element has a second foot-print with a second area at least 40 percent of the first area.

20. The cooking appliance of claim 18 wherein the second heating element is of a type taken from the group consisting of one or more straight tubular heating elements, one or more circular tubular heating elements, one or more oval tubular heating elements, one or more U-shaped tubular heating elements, one or more wide U-shaped tubular heating elements, one or more M-shaped tubular heating elements, one or more multi M-shaped tubular heating elements, one or more spiral tubular heating elements, one or more animal-shaped heating elements, one or more snake-shaped heating elements, one or more quartz tubular heating elements, one or more offset Y-shaped tubular heating elements, one or more Y-shaped tubular heating elements, one or more scalloped tubular heating elements, one or more X-shaped tubular heating elements, one or more multi-loop Y-shaped tubular heating elements, one or more offset multi-loop Y-shaped tubular heating elements, one or more fan-shaped tubular heating elements, one or more concentric ringed tubular heating elements, one or more C-shaped tubular heating elements, one or more looped Y-shaped tubular heating elements, one or more double star-shaped tubular heating elements, one or more star-shaped tubular heating elements, one or more double burst-shaped tubular heating elements, and one or more burst-shaped tubular heating elements.

21. The cooking appliance of claim 15 wherein the door arrangement comprises left and right outwardly-opening doors.

22. The cooking appliance of claim 21 wherein the left and right outwardly-opening doors are linked together to open and close symmetrically such that opening or closing either one will cause a symmetrical opening or closing of the other.

23. The cooking appliance of claim 21 wherein the one of a grill plate and a griddle plate has a first foot-print with a first area and the second heating element has a second foot-print with a second area at least 40 percent of the first area.

24. The cooking appliance of claim 21 wherein the second heating element is of a type taken from the group consisting of one or more straight tubular heating elements, one or more circular tubular heating elements, one or more oval tubular heating elements, one or more U-shaped tubular heating elements, one or more wide U-shaped tubular heating elements, one or more M-shaped tubular heating elements, one or more multi M-shaped tubular heating elements, one or more spiral tubular heating elements, one or more animal-shaped heating elements, one or more snake-shaped heating elements, one or more quartz tubular heating elements, one or more offset Y-shaped tubular heating elements, one or more Y-shaped tubular heating elements, one or more scalloped tubular heating elements, one or more X-shaped tubular heating elements, one or more multi-loop Y-shaped tubular heating elements, one or more offset multi-loop Y-shaped tubular heating elements, one or more fan-shaped tubular heating elements, one or more concentric ringed tubular heating elements, one or more C-shaped tubular heating elements, one or more looped Y-shaped tubular heating elements, one or more double star-shaped tubular heating elements, one or more star-shaped tubular heating elements, one or more double burst-shaped tubular heating elements, and one or more burst-shaped tubular heating elements.

\* \* \* \* \*